United States Patent [19]

Fu et al.

[11] Patent Number: 5,615,287
[45] Date of Patent: Mar. 25, 1997

[54] IMAGE COMPRESSION TECHNIQUE

[75] Inventors: Chi-Yung Fu, San Francisco; Loren I. Petrich, Livermore, both of Calif.

[73] Assignee: The Regents of the University of California, Oakland, Calif.

[21] Appl. No.: 348,431

[22] Filed: Dec. 2, 1994

[51] Int. Cl.$^6$ ................................................ G06K 9/36
[52] U.S. Cl. .......................... 382/232; 382/199; 382/236; 382/237
[58] Field of Search .................................. 382/232, 236, 382/141, 199, 300, 303, 308, 172; 356/121

[56] References Cited

U.S. PATENT DOCUMENTS

| | | | |
|---|---|---|---|
| 4,399,554 | 8/1983 | Perkins, III et al. | 382/141 |
| 4,546,433 | 10/1985 | Tucker | 382/308 |
| 4,742,552 | 5/1988 | Andrews | 382/308 |
| 5,093,871 | 3/1992 | Klein et al. | 382/172 |
| 5,412,200 | 5/1995 | Rhoads | 356/121 |
| 5,432,870 | 6/1995 | Schwartz | 382/232 |

OTHER PUBLICATIONS

Antonini, Marc, et al., "Image Coding Using Wavelet Transform", IEEE Transactions on Image Processing (1992), vol. 1, No. 2, pp. 205–220.

C–Cube Microsystems, "JPEG Algorithm Overview" (Sep. 1992).

Carlsson, Stefan, et al., "Sketch Based Representation of Grey Value and Motion Information", From Pixels to Features, Proceedings of a Workshop (1989), pp. 27–39.

Carlsson, Stefan, "Sketch Based Coding of Grey Level Images", Signal Processing (1988), North Holland, vol. 15, pp. 57–83.

DeNatale, F., et al., "A Spline–Like Scheme for Least–Squares Bilinear Interpolation of Images", IEEE (1993), pp. V–141 – V–144.

DeVore, Ronald A., et al., "Image Compression Through Wavelet Transform Coding", IEEE Transactions on Information Theory (Mar. 1992), vol. 38, No. 2, pp. 719–746.

Farvardin, et al., "Adaptive Coding of Images Using Entropy–Constrained Trellis Coded Quantization", IEEE International Conference on Acoustics, Speech and Signal Processing (1993), vol. 5, pp. V–397 – V–400.

Kunt, Murat, et al., "Recent Results in High–Compression Image Coding", IEEE Transactions on Circuits and Systems (1987), vol. CAS–34(11), pp. 1306–1336.

PHADE Software, "The MPEG–FAQ", Version 3.1 (14 May 1994).

(List continued on next page.)

Primary Examiner—Jose L. Couso
Assistant Examiner—Anh Hong Do
Attorney, Agent, or Firm—Henry P. Sartorio

[57] ABSTRACT

An image is compressed by identifying edge pixels of the image; creating a filled edge array of pixels each of the pixels in the filled edge array which corresponds to an edge pixel having a value equal to the value of a pixel of the image array selected in response to the edge pixel, and each of the pixels in the filled edge array which does not correspond to an edge pixel having a value which is a weighted average of the values of surrounding pixels in the filled edge array which do correspond to edge pixels; and subtracting the filled edge array from the image array to create a difference array. The edge file and the difference array are then separately compressed and transmitted or stored. The original image is later reconstructed by creating a preliminary array in response to the received edge file, and adding the preliminary array to the received difference array. Filling is accomplished by solving Laplace's equation using a multi-grid technique. Contour and difference file coding techniques also are described. The techniques can be used in a method for processing a plurality of images by selecting a respective compression approach for each image, compressing each of the images according to the compression approach selected, and transmitting each of the images as compressed, in correspondence with an indication of the approach selected for the image.

45 Claims, 13 Drawing Sheets

OTHER PUBLICATIONS

Press, William H., et al., "Numerical Recipes in C, The Art of Scientific Computing", Cambridge University Press (1992), 2nd ed.

Purcell, Stephen C., "The C-Cube CL550 JPEG Image Compression Processor", C-Cube Microsystems, Inc. (1992).

Ran, X and Farvardin, N., "Adaptive DCT Image Coding Based on a Three-Component Image Model", 1992 IEEE International Conference on Acoustics, Speech and Signal Processing (1992), vol. 3, pp. III-201-III-204.

Ran, X., Ph.D., "A three-component image model based on human visual perception and its applications in image coding and processing", UMI Dissertation Services (1992).

Razavi, Abbas, et al., "A Low Cost Still Picture Compression Chip Set", SPIE Image Processing and Interchange (1992), vol. 1659, pp. 41-46.

Schuster, Rolf, et al., "A Hierarchical Edge Detector Using the First and Second Derivative Operators", SPIE, Intelligent Robots and Computer Vision XI (1992), vol. 1825, pp. 230-241.

Wallace, Gregory K., "The JPEG Still Picture Compression Standard", IEEE Transactions on Consumer Electronics (1992), vol. 38, No. 1, pp. xviii-xxxiv.

Zoran Corporation, "JPEG Image Coder/Decoder", Preliminary Data Sheet (Aug. 1992).

Zoran Corporation, "Discrete Cosine Transform (DCT) Processor", Data Sheet (Jul. 1992).

Zoran Corporation, "040 JPEG Image Compression Chip Set", Product Brief (Jun. 1992).

Zoran Corporation, "Image Compression Coder/Decoder", Preliminary Data Sheet (Jan. 1992).

Zoran Corporation, "Motion Video Compression System Design with the Zoran 040 JPEG Image Compression Chip Set", Technical Note (Nov. 1992), pp. 1-26.

IMAGE COMPRESSION TECHNIQUE

The United States Government has rights in this invention pursuant to Contract No. W-7405-ENG-48 between the United States Department of Energy and the University of California for the operation of Lawrence Livermore National Laboratory.

BACKGROUND

1. Field of the Invention

The invention relates to still and moving image compression techniques.

2. Description of Related Art

Digitized images require a notoriously large amount of storage space to store and a notoriously large amount of bandwidth to transmit. A single, relatively modest-sized image, having 480 by 640 pixels and a full-color resolution of 24 bits per pixel (three 8-bit bytes per pixel), occupies nearly a megabyte of data. At a resolution of 1024 by 768 pixels, a 24-bit color screen requires 2.3 megabytes of memory to represent. A 24-bit color picture of an 8.5 inch by 11 inch page, at 300 dots per inch, requires as much as 25 megabytes to represent.

Video images are even more data intensive, since it is generally accepted that for high-quality consumer applications, images must occur at a rate of at least 30 frames per second. Current proposals for high-definition television (HDTV) call for as many as 1920 by 1035 or more pixels per frame, which translates to a data transmission rate of about 1.5 billion bits per second. This bandwidth requirement can be reduced somewhat if one uses 2:1 interleaving and 4:1 decimation for the U and V chromonance components, but 0.373 billion bits per second are still required.

Traditional lossless techniques for compressing digital image and video information, such as Huffman encoding, run length encoding and the Lempel-Ziv-Welch algorithm, are far from adequate to meet this demand. For this reason, compression techniques which can involve some loss of information have been devised, including discrete cosine transform (DCT) techniques, adaptive DCT (ADCT) techniques, and wavelet transform techniques. Wavelet techniques are discussed in DeVore, Jawerth and Lucier, "Image Compression Through Wavelet Transform Coding", IEEE Transactions on Information Theory, Vol. 38, No. 2, pp. 719–746 (1992); and in Antonini, Barlaud, Mathieu and Daubechies, "Image Coding Using Wavelet Transform", IEEE Transactions on Image Processing, Vol. 1, No. 2, pp. 205–220 (1992), both incorporated by reference herein.

The Joint Photographic Experts Group (JPEG) has promulgated a standard for still image compression, known as the JPEG standard, which involves a DCT-based algorithm. The JPEG standard is described in a number of publications, including the following incorporated by reference herein: Wallace, "The JPEG Still Picture Compression Standard", IEEE Transactions on Consumer Electronics, Vol. 38, No. 1, pp. xviii–xxxiv (1992); Purcell, "The C-Cube CL550 JPEG Image Compression Processor", C-Cube Microsystems, Inc. (1992); and C-Cube Microsystems, "JPEG Algorithm Overview" (1992).

An encoder using the JPEG algorithm has four steps: linear transformation, quantization, run-length encoding (RLE), and Huffman coding. The decoder reverses these steps to reconstitute the image. For the linear transformation step, the image is divided up into 8*8 pixel blocks and a Discrete Cosine Transform is applied in both spatial dimensions for each block. The purpose of dividing the image into blocks is to overcome a deficiency of the DCT algorithm, which is that the DCT is seriously nonlocal. The image is divided into blocks in order to overcome this nonlocality by confining it to small regions, and doing separate transforms for each block. However, this compromise has a disadvantage of producing a tiled appearance (blockiness) upon high compression.

The quantization step is essential to reduce the amount of information to be transmitted, though it does cause loss of image information. Each transform component is quantized using a value selected from its position in each 8*8 block. This step has the convenient side effect of reducing the abundant small values to zero or other small numbers, which can require much less information to specify.

The run-length encoding step codes runs of same values, such as zeros, in items identifying the number of times to repeat a value, and the value to repeat. A single item like "8 zeros" requires less space to represent than a string of 8 zeros, for example. This step is justified by the abundance of zeros that usually result from the quantization step.

Huffman coding translates each symbol from the run-length encoding step into a variable-length bit string that is chosen depending on how frequently the symbol occurs. That is, frequent symbols are coded with shorter codes than infrequent symbols. The coding can be done either from a preset table or one composed specifically for the image to minimize the total number of bits needed.

Similarly to JPEG, the Motion Pictures Experts Group (MPEG) has promulgated two standards for coding image sequences. The standards are known as MPEG I and MPEG II. The MPEG algorithms exploit the common fact of relatively small variations from frame to frame. In the MPEG standards, a full image is compressed and transmitted only once for every 12 frames. The JPEG standard is typically used to compress these "reference" or "intra" frames. For the intermediate frames, a predicted frame is calculated and only the difference between the actual frame and the predicted frame is compressed and transmitted. Any of several algorithms can be used to calculate a predicted frame, and the algorithm is chosen on a block-by-block basis depending on which predictor algorithm works best for the particular block. Motion detection can be used in some of the predictor algorithms. MPEG I is described in detail in International Standards Organization (ISO) CD 11172, incorporated by reference herein in its entirety.

Accordingly, for compression of video sequences, the MPEG technique is one which treats the compression of reference frames substantially independently from the compression of intermediate frames between reference frames. The present invention relates primarily to the compression of still images and reference frames for video information, although aspects of the invention can be used to accomplish video compression even without treating reference frames and intermediate frames independently.

The JPEG standard achieves still image compression ratios of about 10:1 to 20:1 or more, depending on the image and the user's standard for acceptable quality. While this is better than the compression ratios of standard lossless techniques, it is still inadequate considering the huge numbers of still and moving images which are likely to require storage and transmission in the near future. Wavelet-based compression techniques generally achieve compression ratios which are better than those achieved by DCT-based techniques such as JPEG, but they are still inadequate.

Other techniques exist for compressing still images, involving the separation of, and separate coding of, different types of information from the original image. These separate codings allow the coding techniques to be optimized for the type of information. In Ran and Farvardin, "Adaptive DCT Image Coding Based on a Three-Component Image Model", 1992 IEEE International Conference on Acoustics, Speech and Signal Processing, Vol. 3, pp. 201–204 (1992), incorporated herein by reference, there is described a three-component technique in which what is referred to as "strong edge" information from a still image is encoded separately from the sum of a smooth portion of the image and a textured portion of the image.

The above techniques for compressing digitized images represent only a few of the techniques that have been devised. However, none of the known techniques yet achieve compression ratios sufficient to support the huge still and video data storage and transmission requirements expected in the near future. The techniques also raise additional problems, apart from pure compression ratio issues. In particular, for real time, high-quality video image decompression, the decompression algorithm must be simple enough to be able to produce 30 frames of decompressed images per second. The speed requirement for compression is often not as extreme as for decompression, since for many purposes, images can be compressed in advance. Even then, however, compression time must be reasonable to achieve commercial objectives. In addition, many applications require real time compression as well as decompression, such as real time transmission of live events. Known image compression and decompression techniques which achieve high compression ratios, often do so only at the expense of requiring extensive computations either on compression or decompression, or both.

Accordingly, there is an urgent need for a new image compression/decompression technique which achieves high compression ratios without sacrificing quality, and does so with a reduced requirement for extensive computations.

SUMMARY OF THE INVENTION

The techniques described herein for compressing and decompressing an image permit significantly improved compression ratios without loss of perceptual quality in the reconstructed image as compared to conventional image compression/reconstruction techniques, and individual steps can be performed more quickly due to their simplicity relative to conventional techniques.

According to the invention, roughly described, an image having an array of pixels each having a value, is processed by a method comprising the steps of identifying pixels of the image array which lie on edges of the image; creating a filled edge array of pixels each corresponding to a respective pixel in the image array, each of the pixels in the filled edge array which corresponds to an edge pixel having a value equal to the value of a pixel of the image array selected in response to the edge pixel, and each of the pixels in the filled edge array which does not correspond to an edge pixel having a value which is a weighted average of the values of surrounding pixels in the filled edge array which do correspond to edge pixels; and subtracting the filled edge array from said image array to create a difference array of pixels. The edge file and the difference array can then be separately compressed and transmitted or stored, the difference array optionally being decimated before being compressed. The original image can later be reconstructed by creating a preliminary filled edge array of pixels in response to a received edge file, and adding the preliminary array to the received difference array.

Advantageously, the step of identifying edge pixels comprises the steps of identifying each pair of adjacent pixels (one on each side of the edge), (a) between which a local derivative exceeds a predetermined threshold in magnitude, (b) at which local Laplacians have opposite signs in the correct direction, and (c) at which the difference between the local Laplacians exceeds predetermined thresholds in magnitude.

Also advantageously, the pixels of the image array selected in response to the edge pixels can be either the edge pixel itself or a pixel some distance away from the edge pixel, or an average of several pixels on a line extending away from the edge.

Also advantageously, the weighted average values of the filled edge array are obtained by solving Laplace's equation over the filled edge array taking the edge pixels as boundary conditions. Preferably, Laplace's equation is solved using a novel multi-grid method which comprises the steps of, assuming the filled edge array has a size of M pixels in a first dimension and N pixels in a second dimension, (1) preparing a next coarser level array having M/A pixels in the first dimension and N/B pixels in the second dimension, where A and B are predetermined integers at least one of which is greater than 1, each pixel in such next coarser level array corresponding to a respective pixel in the filled edge array, each pixel in such next coarser level array having a value fixed at the value of the corresponding pixel in filled edge array if the corresponding pixel in filled edge array is fixed, each pixel in such next coarser level array having a value fixed at a weighted average of the values of those pixels in a predefined neighborhood of the corresponding pixel in the filled edge array which are fixed, if the corresponding pixel in the filled edge array is not fixed but at least one pixel in such neighborhood is fixed; (2) solving Laplace's equation over the values of such next coarser level array of pixels, taking as boundary conditions those values of such next coarser level array which are fixed; (3) setting the value of each pixel in the filled edge array which is not fixed, the neighborhood of which pixel includes at least one pixel whose value is fixed, to a weighted average of the values of those pixels in such neighborhood which are fixed; (4) after solving Laplace's equation over the values of said next coarser level array, setting the value of each pixel in the filled edge array which is not fixed and which corresponds to a pixel of such next coarser level array, the neighborhood of which pixel in the filled edge array includes no pixel whose value is fixed, to the value of the corresponding pixel of said next coarser level array; (5) setting the value of each pixel in the filled edge array which is not fixed and which does not correspond to a pixel of said next coarser level array, the neighborhood of which pixel in the filled edge array includes no pixel whose value is fixed, to a weighted average of the values of those pixels in said next coarser level array which correspond to a pixel in the neighborhood of the pixel in the filled edge array; and subsequently (6) solving Laplace's equation over the values of said filled edge array, taking as boundary conditions those values of the filled edge array which are fixed, and taking as initial values those values of the filled edge array which are not fixed.

Also advantageously, the compression of the edge file can be performed by identifying contours of the image array in response to the edge pixels, and encoding the contours. The contour encoding can comprise the steps of representing each contour as one or more symbols each indicating a pixel value and a direction to the next edge pixel in the contour, and Huffman encoding the symbols. Other known techniques can substitute for Huffman encoding, such as LZW, arithmetic coding, and Q-coding. Alternatively, the contour encoding can comprise the steps of representing each contour as one or more piecewise best-fit curves, and Huffman encoding parametric representations of such curves.

In another aspect of the invention, a method for processing a plurality of images each being represented by a respective image array of pixels, comprises the steps of: (1) selecting a respective compression approach for each of the images from a plurality of available compression approaches; (2) compressing each of the images according to the compression approach selected for the image; and (3) transmitting each of the images as compressed, in correspondence with an indication of the approach selected for the image, wherein a first one of the available compression approaches comprises, for a subject image, the steps of identifying edge pixels of the subject image and encoding an indication of each of the edge pixels in correspondence with a value of each of said edge pixels.

The high compression ratios achievable with the invention permit the transmission of images and video over narrower bandwidth channels. For transmissions using allocated electromagnetic spectrum space, the ability to use a narrower bandwidth permits a shift from higher frequency carriers to lower frequency carriers. This reduces the cost of transmission since bandwidth tends to be more expensive for higher frequency carriers than for lower frequency carriers.

The invention can be used in many commercial applications, including but not limited to teleconferencing, multimedia, HDTV, virtual reality, bankcheck compression, documentation compression, facsimile transmission, networking, internet communications and storage, communications and storage on the information highway, videophones, battlefield simulation, graphical simulation, information visualization such as scientific visualization from scientific models, cartoons, medical records such as X-ray images, CT scans, MRIs, PET scans, as well as any other application that can benefit from compression.

Other features, advantages and aspects of the invention will become apparent upon a reading of the remainder of the specification and claims hereof.

BRIEF DESCRIPTION OF THE DRAWINGS

The invention will be described with respect to particular embodiments thereof, and reference will be made to the drawings, in which.

DETAILED DESCRIPTION

Figure 1:
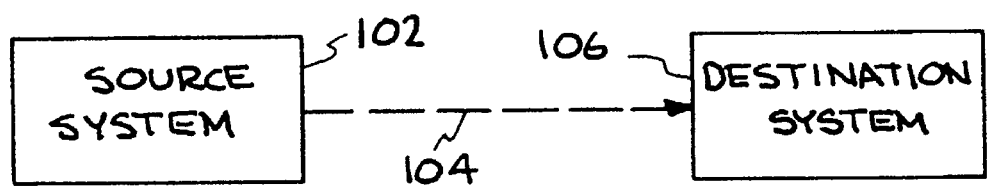
FIG. 1 is an overall block diagram illustrating apparatus incorporating the invention.

FIG. 1 is an overall block diagram illustrating apparatus incorporating the invention. It comprises a source system 102, a transmission medium 104, and a destination system 106. The source and destination systems can be computer systems or dedicated hardware units, and the transmission medium 104 can include parts of a cable television network, computer network, radio link, satellite link, data storage medium (such as a floppy disk or CD-ROM) which is hand carried from the source system 102 to the destination system 106, or any other medium by which information can be transmitted from a source to a destination. Additionally, although not illustrated in FIG. 1, the invention can be implemented in the manner in which the source and destination are two separately executing processes running on a single computer system, either concurrently or separated in time; in this case the transmission medium 104 might include local volatile memory, a local cache memory, a local bus, and/or a local or network mass storage device.

Figure 2:
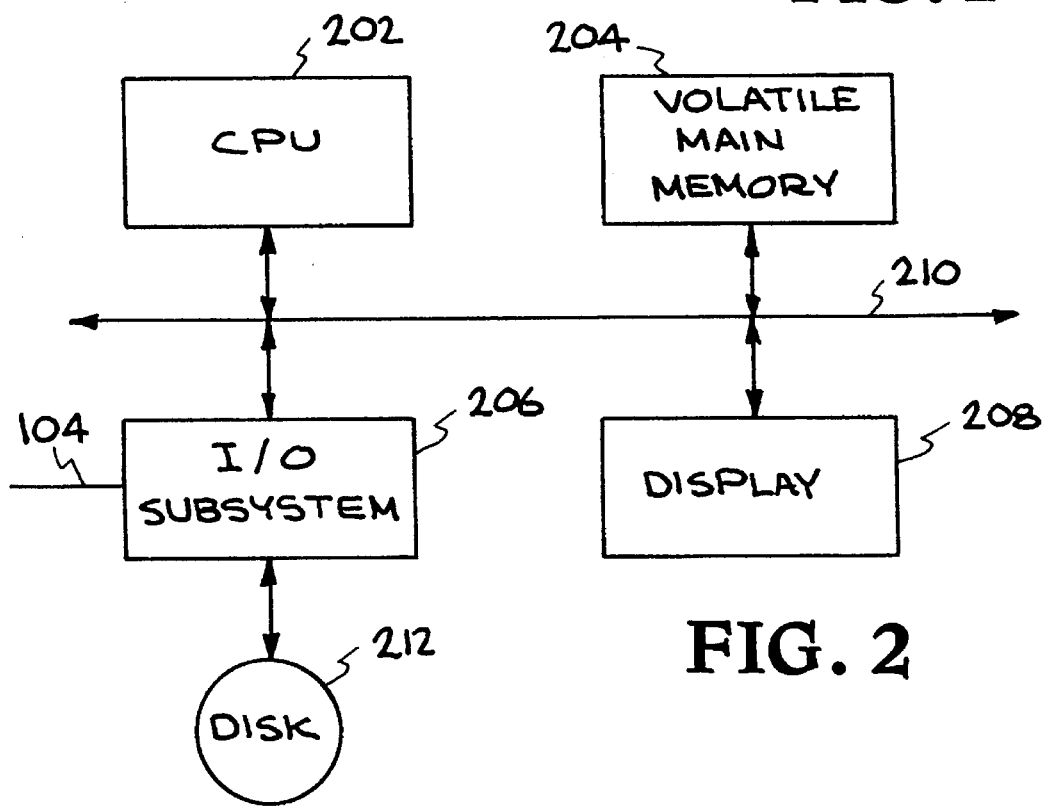
FIG. 2 illustrates a typical hardware computer system platform which in one embodiment executes software for implementing the invention.

Although no particular hardware platform is required to implement the present invention, FIG. 2 illustrates a possible hardware platform, in this case a computer system platform, which in one embodiment executes software for implementing the invention. The computer system of FIG. 2 comprises a CPU 202, main memory 204, which may be volatile, an I/O subsystem 206, and a display 208, all coupled to a CPU bus 210. The I/O subsystem 206 communicates with peripheral devices such as a disk drive 212. In operation, a computer program implementing aspects of the invention is retrieved from the disk 212 into main memory 204 for execution by the CPU 202. If the system of FIG. 2 represents a source system 102 (FIG. 1), then one or more source images can be located on the disk drive 212 or provided by an external source (not shown). These images are retrieved by the CPU 202, running under the control of the computer program. The CPU operating under the control of the computer program processes the images in the manner set forth herein, and either stores them back on disk 212 or transmits them over the transmission medium 104 (FIG. 1) to the destination system. If the computer system of FIG. 2 represents the destination system 106 (FIG. 1), then it receives the compressed image or images over the transmission medium 104, and in accordance with a decompression computer program which the CPU 202 retrieved from the disk 212, decompresses them and outputs them either back to the disk 212, or to the display 208, or to some other device (not shown).

It is worthwhile noting that the invention concerns manipulation of physical signals representing color or luminance values, not merely manipulation of the abstract values themselves, although the reasons for manipulating the physical signals in the manner herein described derive from the mathematical manipulations of the numeric values that the physical signals represent. The invention also concerns manipulation of physical signals representing the position of a color value in an array of color values, as well as physical signals indicating other information as described more fully herein. The physical signals may be, for example, electrical signals having a voltage which, when above a predefined threshold represent a logic 1, and which, when below a predefined threshold represent a logic 0. The physical signals representing a value may be carried on several conductors (for example, if the value is represented in binary), and thus the physical signals representing such a value may comprise a group of physical signals. At times the physical signals are stored in the state of a flip-flop, latch, capacitance or other storage circuit in the systems 102 and 106 (FIG. 1). The physical signals can also be electrical signals having an analog voltage or current level which represents a color or luminance value.

It is to be noted also that in many instances it is convenient to describe physical signals in terms of the numbers they represent. For example, the following description uses phrases such as calculating a derivative. This is to be read merely as a shorthand way of defining not only the underlying mathematical steps performed by the circuitry on the values represented by the physical signals, but also the physical steps of receiving signals representing the values, performing a manipulation of those signals corresponding to the mathematical steps, and generating physical output signals representing the indicated result. Such a phrase is further to be read as implying that a finite time is required to propagate signals through the circuitry which performs the manipulation. In similar fashion, other phrases used herein are to be read merely as a shorthand way of defining the physical steps of receiving signals representing values, performing a manipulation on the signals which corresponds to the described function, and generating physical output signals representing the result. The invention also concerns the transmission of information via a physically real medium such as a transmission line or a storage element.

In view of the above, it is understood that the present invention deals with physical entities such as physical signals that represent various numeric values, with physical media, and with image processing hardware that inputs, processes and outputs such physical signals, as well as image data signals which can ultimately cause a physical light image to be rendered and observed by a viewer, for example, on a display.

Figure 3:
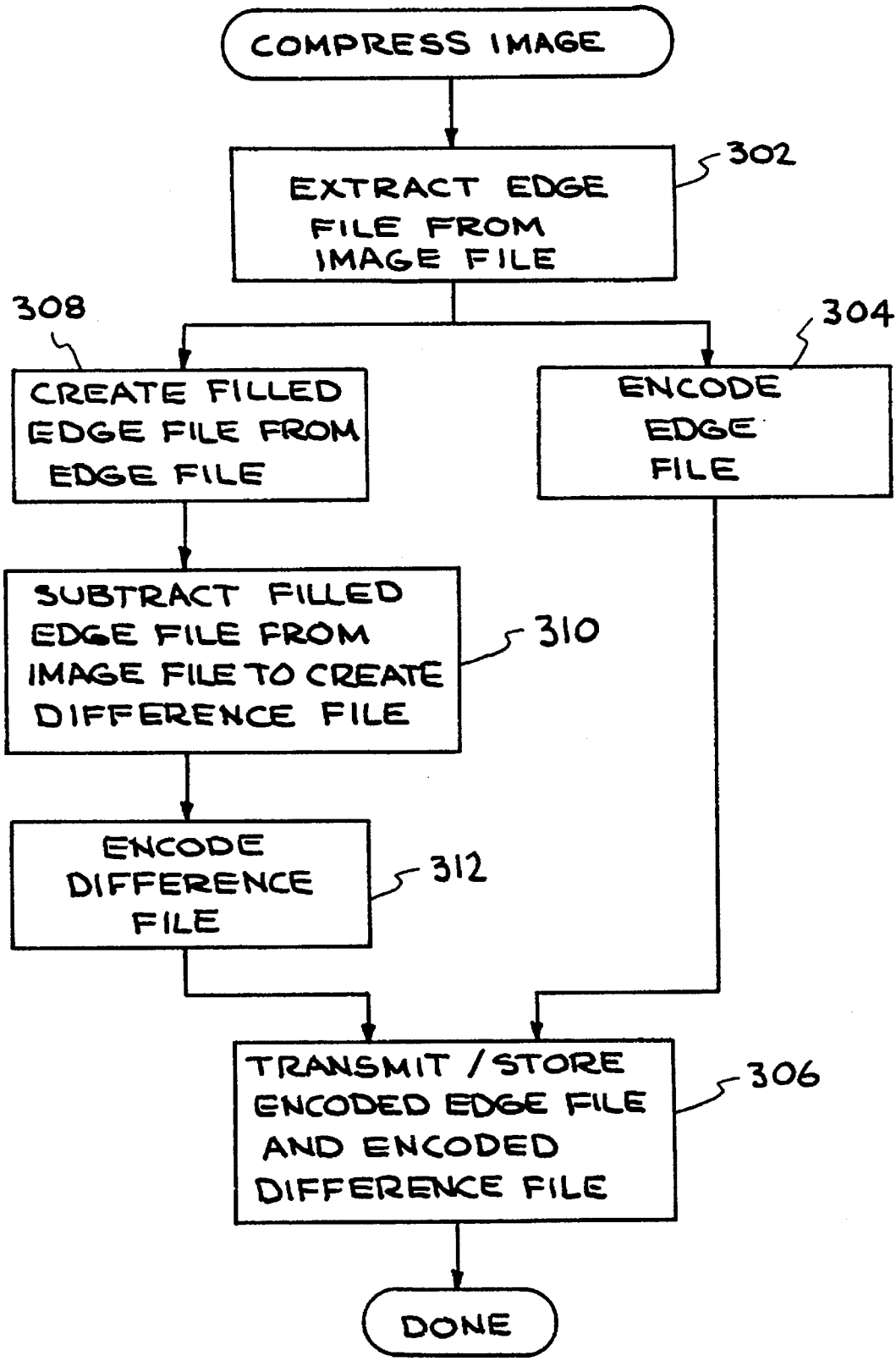
FIG. 3 is a flow chart illustrating process steps used to compress an image according to an embodiment of the invention.

FIG. 3 is a flow chart illustrating the process steps used to compress an image according to an embodiment of the invention. Initially, an image is provided in the form of a rectangular array of pixels. If the image is black and white, then only one color plane is present, each pixel having associated with it a single value indicating a gray level for the pixel. If the image is a color image, then three color planes may be present, each pixel having associated with it three values indicating respective brightness levels for red, green and blue components of the pixel color. It will be understood that although the red, green and blue color axes are used in the presently described embodiment, other color axes, such as (red minus yellow), (blue minus yellow) and luminance, can be used instead.

Moreover, the array is represented physically in main memory 204 (FIG. 2) as a one-dimensional list of values, each at a respective address. The array is considered to be a two-dimensional array, however, since a predefined formula exists which maps any pair of address values (x,y) to a respective unique element in the list. If the image has three color planes, then a third coordinate value might be provided as well to indicate the particular color plane being selected for each pixel.

Additionally, each element in the image array is referred to herein as a "pixel" because it corresponds to a respective discrete square or rectangle when the image is displayed. Specifically, the array is considered to have a horizontal dimension because when displayed, horizontally sequential ones of the pixel rectangles on the display will be displayed with colors (or gray levels) responsive to the color values stored in the array at a fixed coordinate in one dimension (the vertical dimension) and at sequential coordinates in the other (second) dimension (the horizontal dimension). Similarly, the array is considered to have a vertical dimension because when displayed, vertically sequential ones of the pixel rectangles on the display will be displayed with colors (or gray levels) responsive to the color values stored in the array at a fixed coordinate in the second dimension (horizontal dimension) and at sequential coordinates in the first dimension (vertical dimension).

The flow chart of FIG. 3 illustrates the processing of a single still image. While steps are illustrated as being performed sequentially, with each step completed before the next step begins, it will be understood that the process can be pipelined in many instances such that subsequent process steps begin before prior process steps are completed. If a sequence of images is being processed, the processing of one image may begin before the processing of a prior image is completed. Additionally, different images or different parts of an image might be processed according to the process steps of FIG. 3 in parallel on separate hardware, and/or different steps of the process of FIG. 3 with respect to a single image can be performed in parallel on different hardware. The steps illustrated in FIG. 3 (and its detail flow charts) can also be rearranged in some instances without changing the overall functions which are illustrated in the figure.

Referring to FIG. 3, in a step not shown, the image array to be compressed may be optionally pre-filtered to minimize noise. In a step 302, edges, or color boundaries, are identified in the image in a manner hereinafter described. Roughly, edges are pixels which lie at a perceived border between two regions of the image, and typically carry much of the information which a viewer perceives in an image. The edges can be considered to be located on the pixels themselves, in which case only one pixel is identified for each edge, or preferably, edges can be considered to be located between pixels, in which case each of the two adjacent pixels are considered to be edge pixels. The latter formulation is used in the present embodiment. In step 302, a file is created which identifies each of the edge pixels in the image array, together with their color values. As used hereinafter, the term "color value" will be understood to include a "gray-scale value" if the image is a gray-scale image. Also as used herein, the term "file" is used merely to represent a collection of information; it is not necessarily stored separately as a file in a file system in a computer mass storage device. If indeed it is stored in a computer mass storage device, it may occupy only part of a file system file, exactly one file system file, or more than one file system file depending on the implementation.

In a step 304, since the edge information carries much of the perceptual information of the image, the edge file is encoded using one or more of the techniques described hereinafter. The encoded edge file is transmitted to the destination in a step 306.

The edge file created in step 302 is also used in step 308 to create a "filled" edge file. Techniques for filling an edge file are described hereinafter, but roughly, the step involves first creating an array corresponding to the original image array, and copying in the values of only the edge pixels. The filled edge array is then obtained by smoothing the remaining pixels Of the edge array in such a way as to minimize the color value gradients of the image, taking the edge pixels as fixed. The most accurate solution to the problem is obtained by solving Laplace's equation, taking the edge pixels as boundary conditions in the solution of the partial differential equation:

$$\frac{\partial^2 u}{\partial x^2} + \frac{\partial^2 u}{\partial y^2} = 0$$

where u represents the color value of a pixel and x and y represent its coordinates in the image. The term "boundary condition" is used herein in its partial differential mathematical sense; it is not intended to refer to borders of the image. For color images, Laplace's equation is solved independently in each color plane.

A novel technique for solving Laplace's equation for such conditions is given hereinafter. In general, however, it is not essential that the solution be perfect. Roughly, it is desirable that each non-edge pixel in the array, for a given color plane, have a resulting value which is a weighted average of all of the edge pixels which surround it. In the weighted average, each edge pixel should have a contribution which decreases as the edge pixel becomes more distant from the pixel value being computed. The contribution need not be exactly proportional to the inverse distance, although that could work as well. Also, other edge pixels in addition to those immediately surrounding a subject non-edge pixel could influence the weighted average as well in a given embodiment. In general, the value to be assigned to each non-edge pixel j in the array is given by $$I(\vec{x}_j) = \Sigma_i \, G(\vec{x}_j, \vec{x}_i) \, I(\vec{x}_i),$$

where $\vec{x}_j$ is a vector indicating the horizontal and vertical coordinates of the non-edge pixel j, i is the number of an edge pixel, $\vec{x}_i$ is a vector indicating the horizontal and vertical coordinates of the edge pixel i, G is a weighting array typically calculated for the subject image.

After the filled edge array is created in step 308, it is subtracted, pixel by pixel, from the original image file to create a difference array (step 310). Again, if three color planes are present, then the subtraction occurs separately for each of the three color planes.

In step 312, the difference file is encoded in a manner hereinafter described, and in step 306, it is transmitted together with the encoded edge file (step 304) to the destination system 106.

Figure 4:
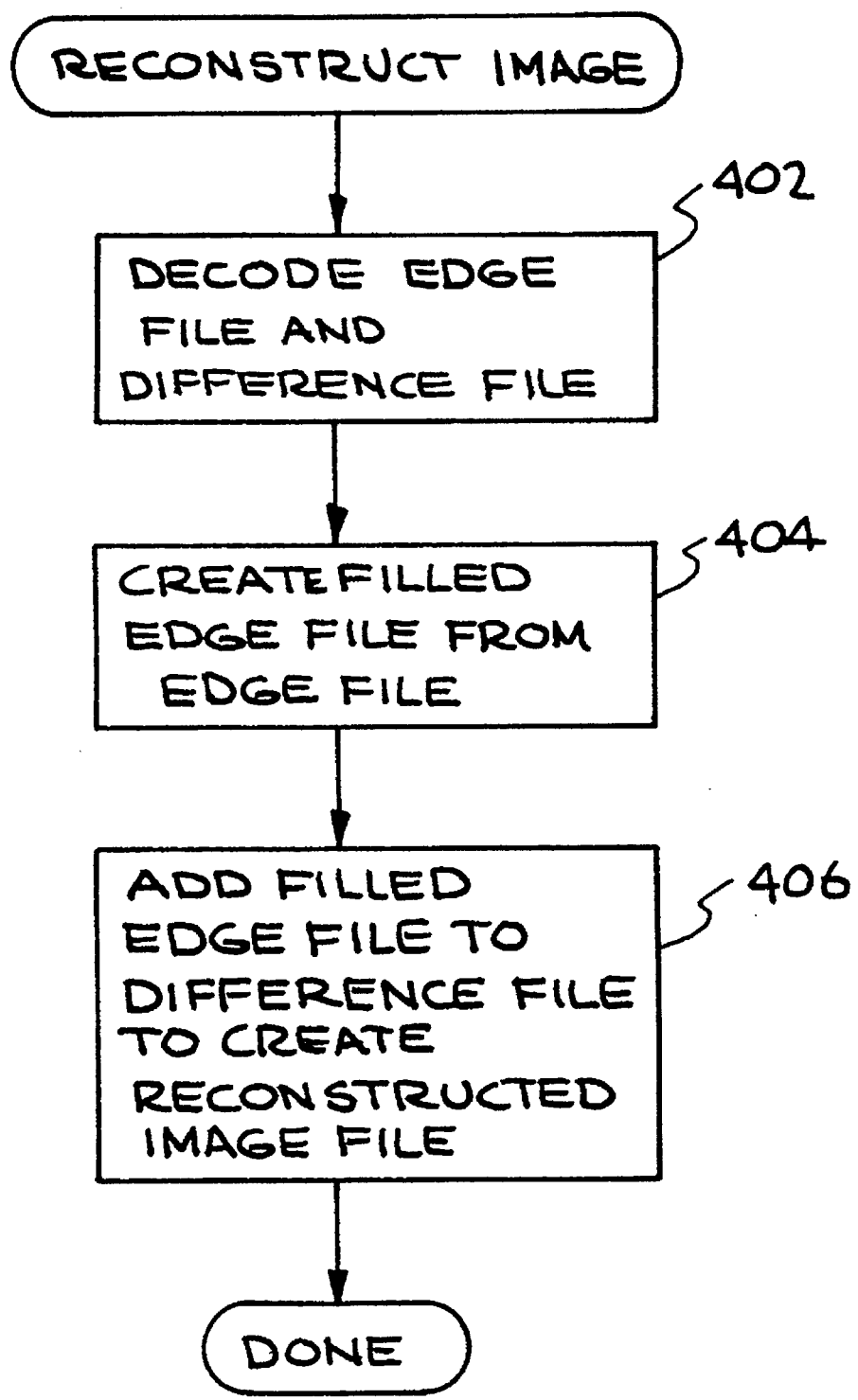
FIG. 4 is a flow chart illustrating steps performed by a destination system upon receipt of an image compressed using the procedure of FIG. 3.

FIG. 4 is a flow chart illustrating the steps performed by the destination system 106 upon receipt of an image compressed using the procedure of FIG. 3. Specifically, in a step 402, the edge file and difference file received from the source system are decoded using decoding algorithms complementary to those with which they were encoded in steps 304 and 312, respectively. In step 404, a filled edge file is created from the decoded edge file. The filled edge file produced in step 404 should be the same as the filled edge file produced in step 308, although different algorithms may be used to achieve it. For example, if the filled edge file produced in step 308 is created by solving Laplace's equation, then so should the filled edge file produced by step 404. However, different algorithms for solving Laplace's equation can be used. In a typical embodiment, the algorithm used for creating the filled edge file in step 404 will be the same as that used to create the filled edge file in step 308.

In step 406, the filled edge file created in step 404 is added to the difference file decoded in step 402 to create the reconstructed image file.

Figure 5:
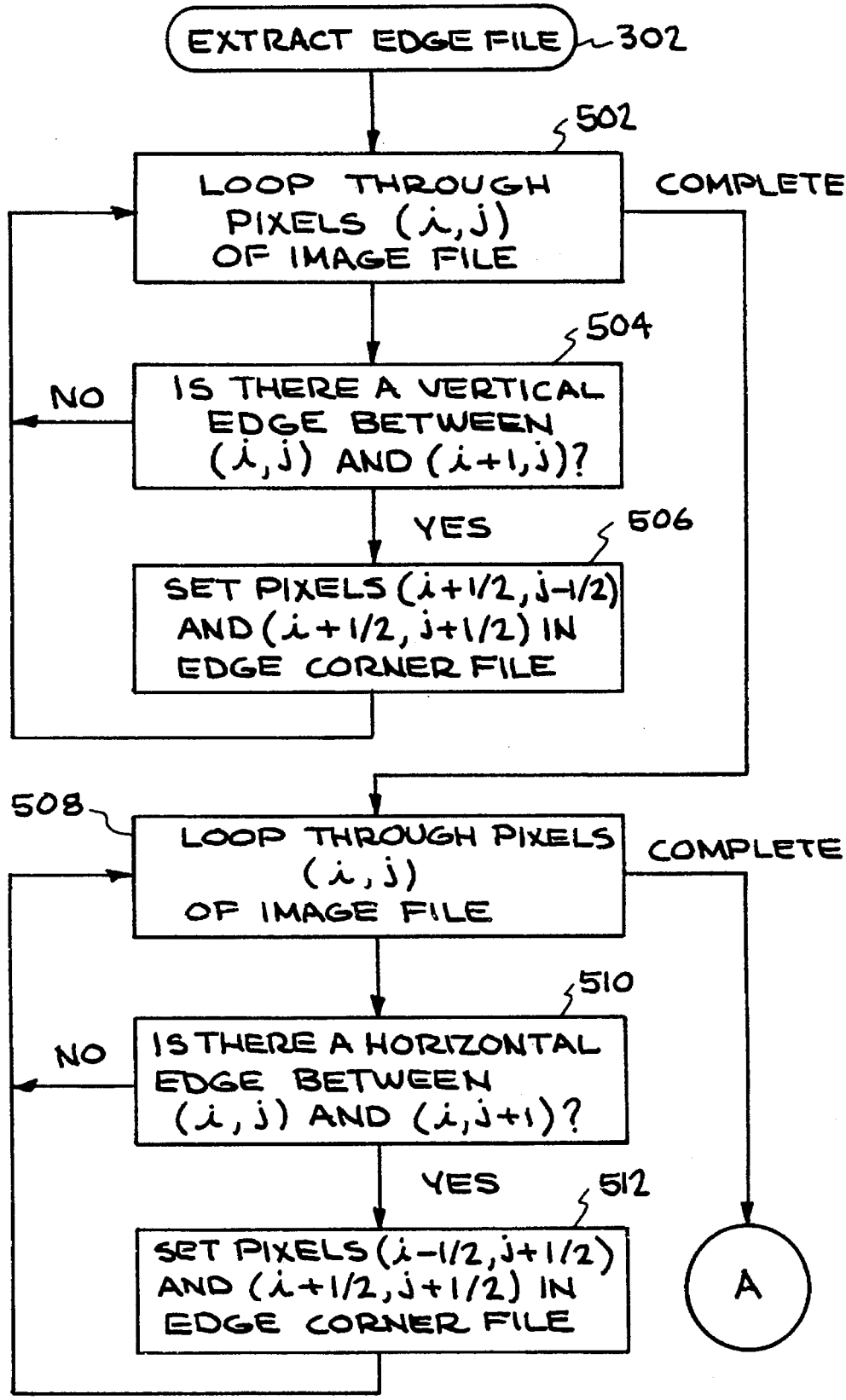
FIGS. 5 and 6 illustrate a flow chart describing a technique for extracting the edge pixels in FIG. 3.
Figure 6:
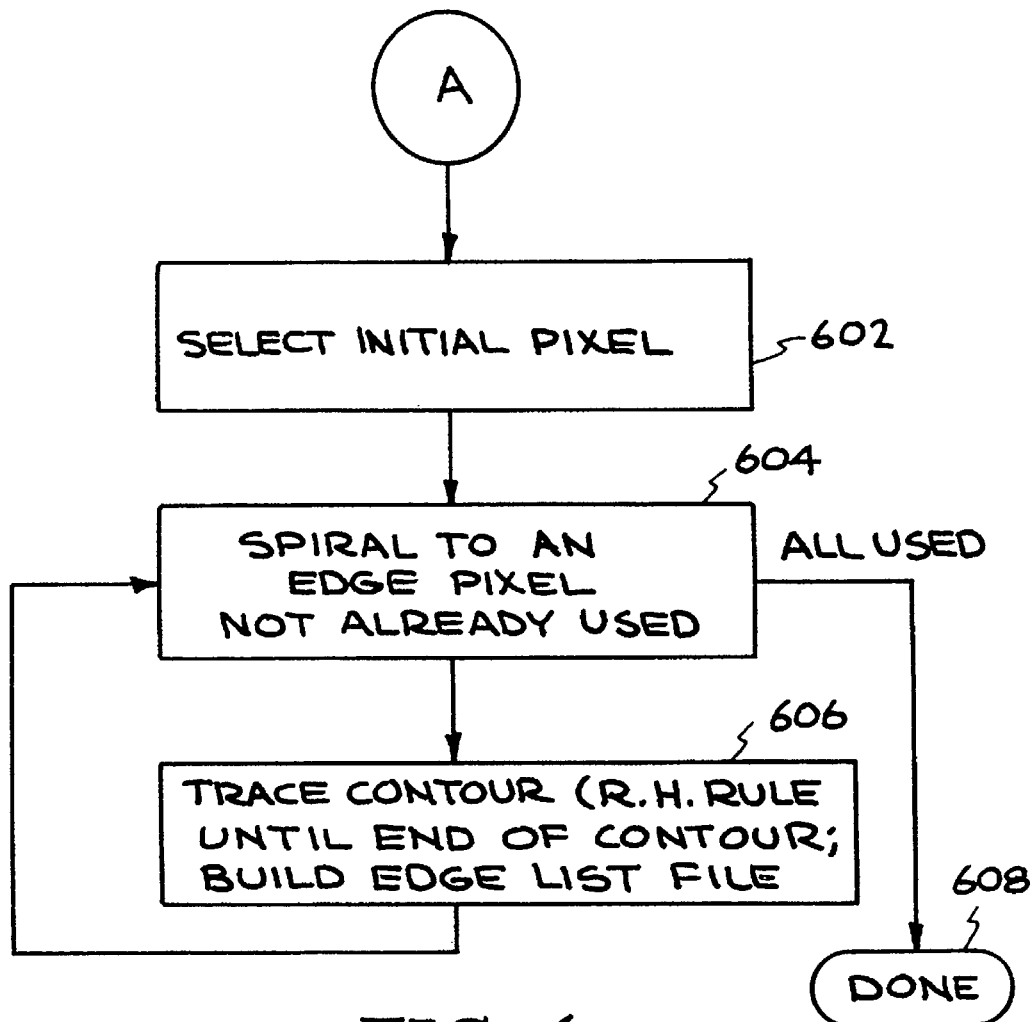

FIGS. 5 and 6 together illustrate a flow chart describing a technique for extracting the edge pixels in step 302 (FIG. 3). Other, less preferred techniques, are set forth in Schuster, Ansari and Bani-Hashemi, "A Hierarchical Edge Detector Using the First and Second Derivative Operators", SPIE, Vol. 1825 Intelligent Robots and Computer Vision XI, pp. 230–241 (1992); Kunt, Bénard and Leonardi, "Recent Results in High-Compression Image Coding", IEEE Transactions on Circuits and Systems, Vol. CAS-34 (11), pp. 1306–36 (1987); in Carlsson, "Sketch Based Coding of Gray Level Images", Signal Processing, North Holland, Vol. 15, pp. 57–83 (1988); and the paper by Ran and Farvardin mentioned above. All of such publications are incorporated herein by reference in their entirety. Many other techniques are also available, but are less preferred than the technique described herein.

Referring to FIG. 5, steps 502, 504 and 506 search for vertical edges between horizontally adjacent pixels in the original image file, and steps 508, 510 and 512 search for horizontal edges between vertically adjacent pixels in the original image file. Specifically, in step 502, all of the pixels (i,j) in the original image array are traversed in a loop. In step 504 of the loop, a determination is made as to whether a vertical edge exists in the image between the current pixel (i,j) and the horizontally next pixel (i+1,j). If not, then the loop continues at step 502. If so, then in step 506, two pixels are set in an edge corner array to indicate that an edge exists between the two indicated corners in the original image file.

Figure 7:
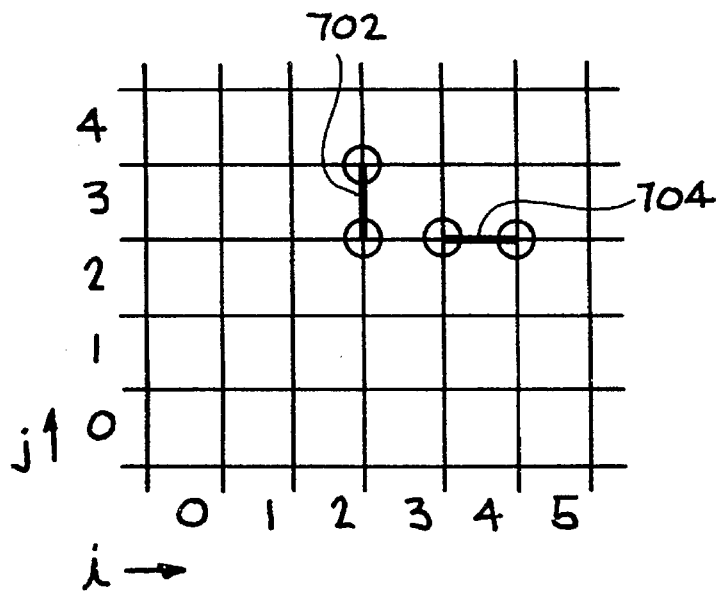
FIGS. 7 and 10 show portions of an image being compressed.

This is best illustrated in FIG. 7, which shows a portion of the original image having 20 pixels numbered (i,j)=(0,0) through (5,4). The image array pixels are represented by the spaces within the rectangles in the grid of FIG. 7, and a vertical edge 702 is shown between pixels (2,3) and (3,3). If the vertical edge 702 is detected in step 504, then in step 506, an edge corner array, containing a Boolean value for each corner in the grid of FIG. 7, is set in step 506. The edge corner array can be thought of as an array with elements corresponding to each of the elements in FIG. 7, but offset by one-half of an element in each of the two dimensions. Thus, for nomenclature purposes, step 506 will set, in the edge corner file, pixels referred to herein as (2½, 2½) and (2½, 3½).

In step 508, all of the pixels in the image file are again examined in a loop, and in step 510, it is determined whether a horizontal edge exists between pixels (i,j) and (i,j+1) in the original image. Such an edge is illustrated as 704 in FIG. 7. If the edge is detected in step 510, then in step 512 the pixels in the edge corner file representing corners (i–½, j+½) and (i+½, j+½) are set. In the example of FIG. 7, pixels in the edge corner file at array locations (3½, 2½) and (4½, 2½) are set. The loop then continues in step 508 until all pixels have been examined.

Figure 8:
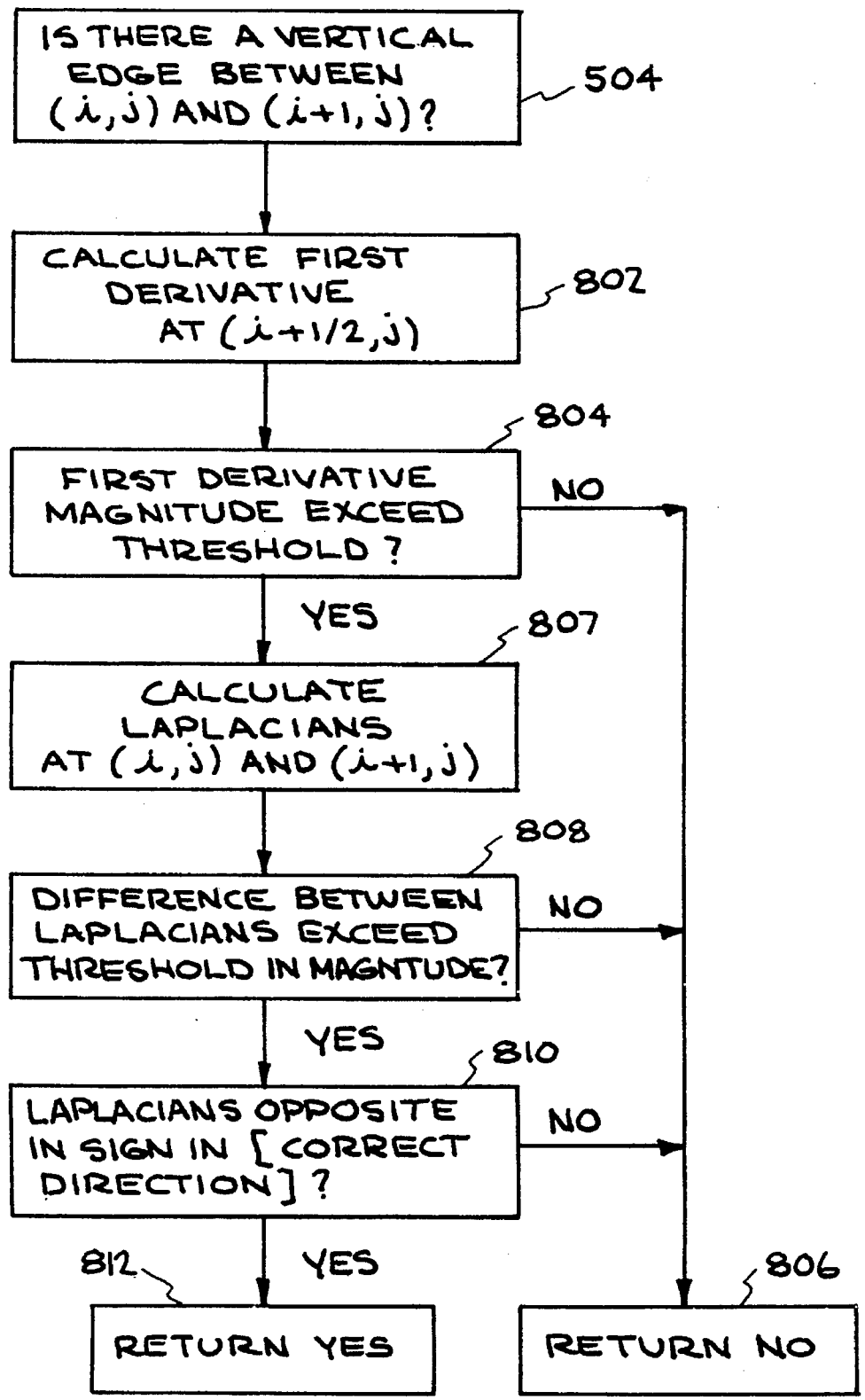
FIG. 8 is a flow chart of a procedure for performing step 504 in FIG. 5.

The step 504, in which it is determined whether a vertical edge exists between pixels (i,j) and (i+1,j), is performed using local first and second derivatives of the image. The motivation for using both first and second derivatives is that the first derivative is less sensitive to noise than the second derivative, while the second derivative allows for precise localization of an edge. FIG. 8 is a flow chart setting forth this procedure. Referring to FIG. 8, in a step 802, the first derivative is calculated at pixel position (i+½,j). This is accomplished by taking the dot product of a four-pixel by three-pixel sub-array of the image array, centered at the subject interface between pixels (i,j) and (i+1,j), and a first derivative operator given by:

$$\begin{bmatrix} -1 & -1 & +1 & +1 \\ -1 & -1 & +1 & +1 \\ -1 & -1 & +1 & +1 \end{bmatrix}$$

Note that the first derivative operator can be "centered" at (i+½,j) because the operator contains an even number of elements in the horizontal dimension.

In a step 804, it is determined whether the magnitude of the first derivative exceeds a threshold. If not, then there is no vertical edge between (i,j) and (i+1,j) (step 806). If the magnitude of the first derivative does exceed the threshold, then in step 807, Laplacians are calculated at pixels (i,j) and (i+1,j) (i.e. at each of the two horizontally adjacent pixels on opposite sides of the location where a vertical edge is being tested for). A Laplacian is a second derivative, and in the present embodiment is calculated at a given pixel by multiplying (dot product) a 3 by 3 pixel sub-array centered at the given pixel, by the following Laplacian operator:

$$\begin{bmatrix} +1 & +1 & +1 \\ +1 & -8 & +1 \\ +1 & +1 & +1 \end{bmatrix}$$

If the magnitude of the difference between the Laplacians at the two adjacent pixels do not exceed a threshold, then an edge at the subject location is assumed not to exist (steps 808 and 806). If the magnitude difference does exceed the threshold, then it is determined whether the Laplacians are opposite in sign, and opposite in the correct direction given the sign of the first derivative calculated in step 802 (step 810). The Laplacians are opposite in sign in the "correct direction" if the gradient between them has a sign opposite that of the first derivative. If this last test is satisfied, then an edge has been located (step 812); if not, then an edge has not been located (step 806).

Figure 9:
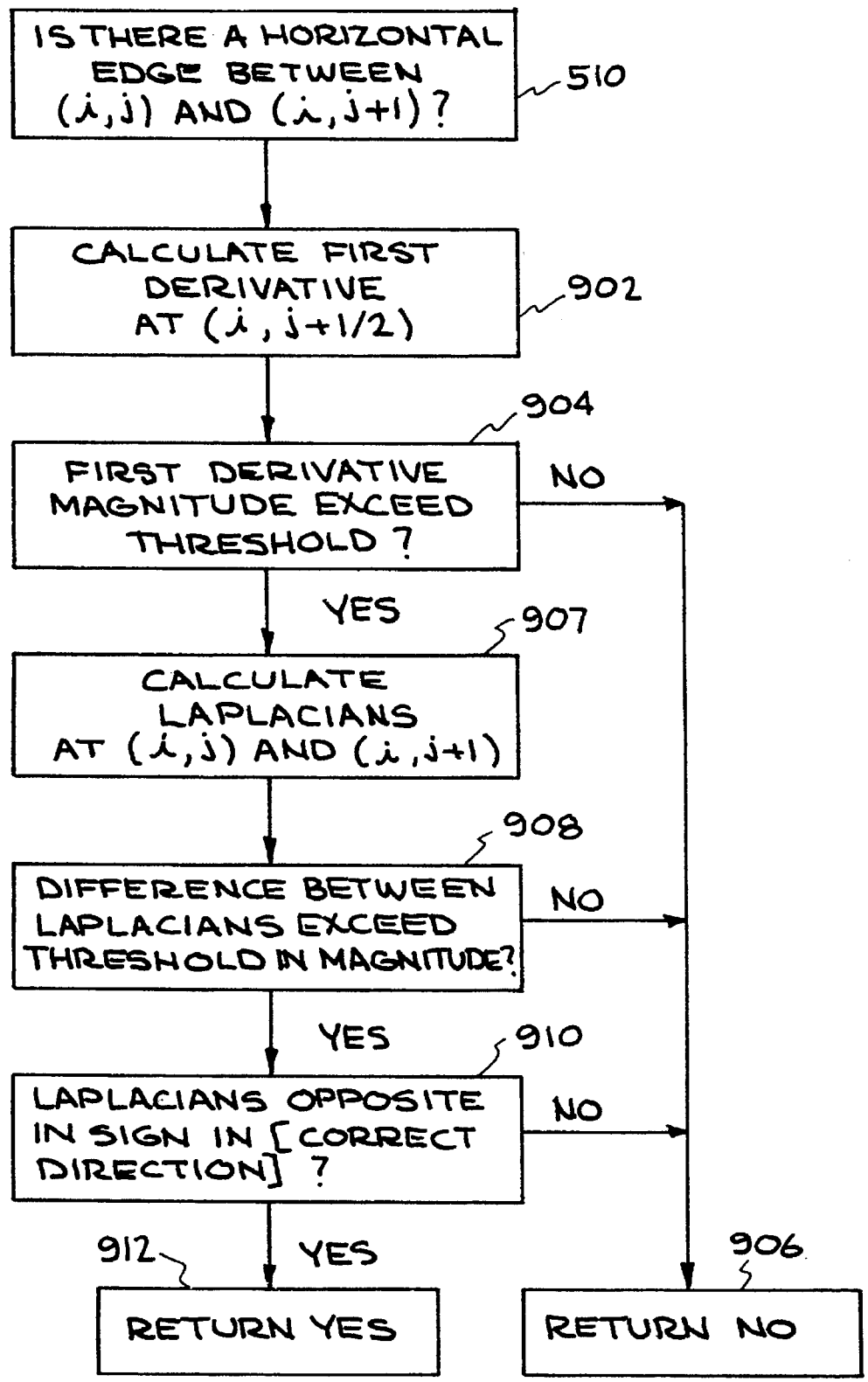
FIG. 9 sets forth a procedure for performing step 510 in FIG. 5.

Similarly, FIG. 9 sets forth the procedure for determining whether there is a horizontal edge between (i,j) and (i,j+1) (step 510 of FIG. 5). The procedure is similar to that of FIG. 8, except that the adjacent pixels which are being examined are vertically adjacent rather than horizontally adjacent, and the first derivative operator is the transpose of that used in FIG. 8.

Referring to FIG. 9, in a step 902, the first derivative is calculated at pixel position (i,j+½). This is accomplished by taking the dot product of a three pixel by four pixel sub-array of the image array, centered at the subject interface between pixels (i,j) and (i,j+1), and a first derivative operator given by:

$$\begin{bmatrix} -1 & -1 & -1 \\ -1 & -1 & -1 \\ +1 & +1 & +1 \\ +1 & +1 & +1 \end{bmatrix}$$

Note that the first derivative operator can be "centered" at (i,j+½) because the operator contains an even number of elements in the vertical dimension.

In a step 904, it is determined whether the magnitude of the first derivative exceeds a threshold. If not, then there is no horizontal edge between (i,j) and (i,j+1) (step 906). If the magnitude of the first derivative does exceed the threshold, then in step 907, Laplacians are calculated at pixels (i,j) and (i,j+1) (i.e. at each of the two vertically adjacent pixels on opposite sides of the location where a horizontal edge is being tested for. The Laplacian is calculated using the transpose of the dot product operator set forth above for FIG. 8, which in the present case is the same as such dot product operator.

If the magnitude of the difference between the Laplacians and the two pixels do not exceed a threshold, then an edge at the subject location is assumed not to exist (steps 908 and 906). If the magnitude difference does exceed the threshold, then it is determined whether the Laplacians are opposite in sign, and opposite in the correct direction (as defined above) given the sign of the first derivative calculated in step 902 (step 910). If this last test is satisfied, then an edge has been located (step 912); if not, then an edge has not been located (step 906).

Returning to FIG. 5, after the searches have been completed for both vertical and horizontal edges, the edges which have been identified are collected into contours as set forth in FIG. 6 as a continuation of the flow chart of FIG. 5. As used herein, a contour is a contiguous string of edge pixels (pixels that are adjacent to inter-pixel edges). A contour can have any number of pixels, and a contiguous portion of a contour is itself considered to be a contour.

Figure 10:
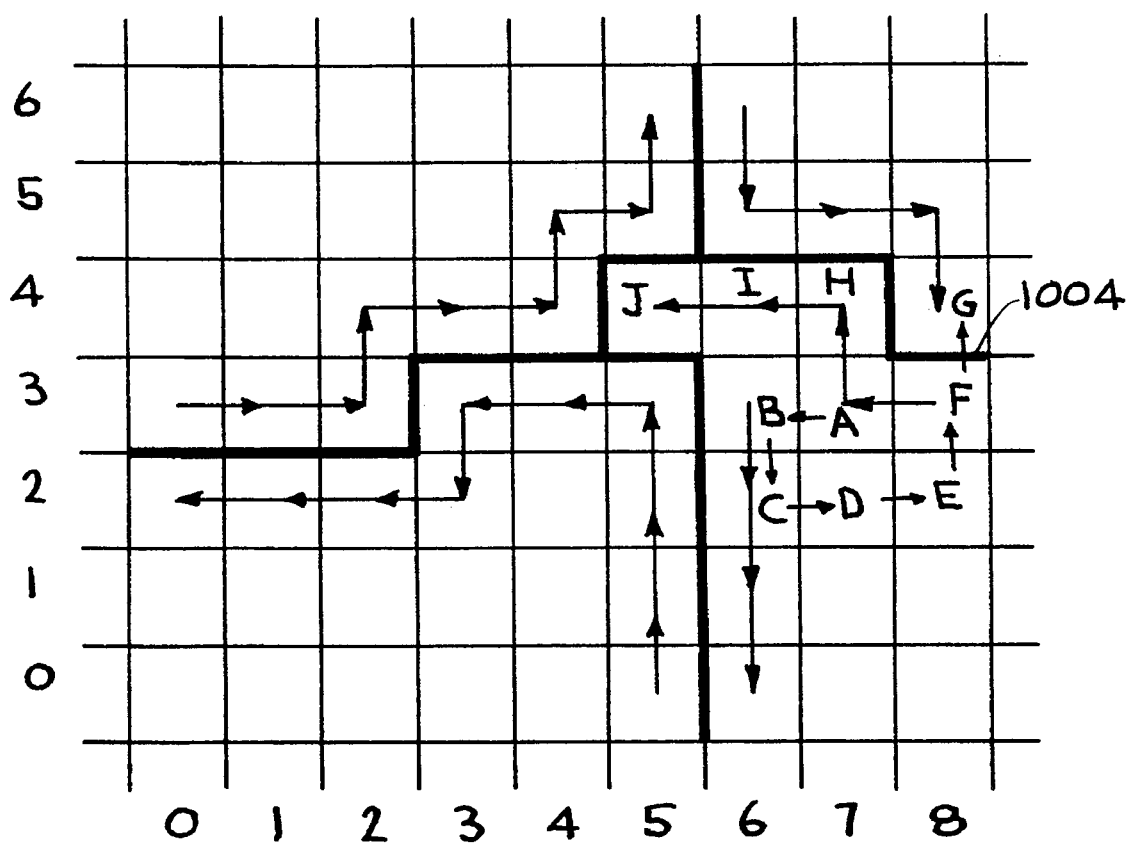

Referring to FIG. 6, in a step 602, a pixel of the image is selected as a starting pixel. In a step 604, a spiral search is performed beginning at the selected pixel, for an edge pixel which has not already been assigned to a contour. For example, referring to FIG. 10, if the initial pixel is that marked A in the figure, then step 604 first checks the edge corner file to determine whether an edge exists between the pixels marked A and B. If not, then it checks for an edge between pixels B and C, and so on in an outwardly spiraling manner until the edge 1004 is detected between pixels L and M. Pixel L is therefore an edge pixel (since it is adjacent to an edge 1004). In a step 606, pixel L is added to an edge list file as the start of a contour, and the contour is "traced" using a right-hand rule. That is, it is traced by imagining a person standing on pixel L in such a manner that his or her right hand (arbitrary choice; left hand would work equally well) touches the edge 1004. The person then walks forward with his or her hand tracing the edges. Thus in the diagram of FIG. 10, the person will traverse pixels A, H, I and then J, at which point the person can walk no further. Those pixels F, A, H, I and J are then added to the edge list file.

In the edge list file, the first entry of a contour specifies the starting pixel location (i.e. the location of pixel F), a direction indicator indicating the direction to the next pixel in the contour (up, down, left or right), and a color value or values. In one embodiment, the color value can be the value of the edge pixel itself. In a second embodiment, the color value can be the value of a pixel which is a predefined number of pixels away from the contour, although if another edge exists at fewer pixels away than twice the predefined number of pixels, then the color value of the pixel at or just before half the distance to that edge is used. In yet a third embodiment, the color value chosen is the average or a weighted average of the values of all the pixels out to a predefined number of pixels away from the contour, although if another edge exists at fewer pixels out than twice the predefined number of pixels, then the color values of all the pixels out to half the distance to that edge are averaged. The purpose of selecting or averaging color values from a pixel or pixels not immediately adjacent to the edge is to accommodate an observation that if an edge is not a sharp edge, then the color value perceived by a viewer at that edge is not necessarily the color value of the edge pixel itself.

Once the last pixel of a contour is traced and added to the contour in the edge list file (step 606), the last pixel (pixel J in FIG. 10) is then used as the starting pixel for another spiral search to an edge pixel not already assigned to a contour (step 604). Only when all edge pixels have been used in contours, is the edge file complete (step 608).

Note that the edge list file and the edge corner file both represent the same set of edges from the original image, but in different forms. Both are therefore considered herein to be "edge files" produced by step 302 (FIG. 3) and subsequent processing uses whichever form is most convenient. The edge list file is also sometimes referred to herein as a contour file.

Referring to FIG. 3, the step 308 of creating a filled edge file from the edge file essentially involves solving Laplace's equation taking the edge pixel values as boundary conditions. Another, less preferred, method for solving Laplace's equation is set forth in the Ran paper incorporated above.

Preferably a multi-grid method is used to solve Laplace's equation. In this method, roughly described, a finest-level grid is created in which the edge pixels are fixed as boundary conditions. A next-coarser-level grid is then created, and the boundary conditions are copied up to the next coarser-level grid wherever possible. Laplace's equation is then solved at such next-coarser level (either by a conventional technique or, preferably, by recursively copying the boundary values up to still coarser grid levels), and the results copied back down to pixels in the finest-level grid which are not already fixed. The values copied down to the finest-level grid form starting values for a conventional iterative solution of Laplace's equation over the finest-level grid.

If the method is used recursively, then effectively a pyramid of grids is created from finest level to coarsest level, then solved from the coarsest level back down to the finest level. The coarsest level is preferably chosen as that level beyond which it is in general no longer more advantageous to use the multi-grid method than to use a conventional method to solve Laplace's equation. The coarsest level can either be predefined at a fixed density of, for example, two pixels in the smallest dimension, or can be predefined by an adaptive test which depends on the number of pixels which are fixed in any current level. For example, the coarsest level could be predefined as the first level in which all pixels are fixed.

Figure 11:
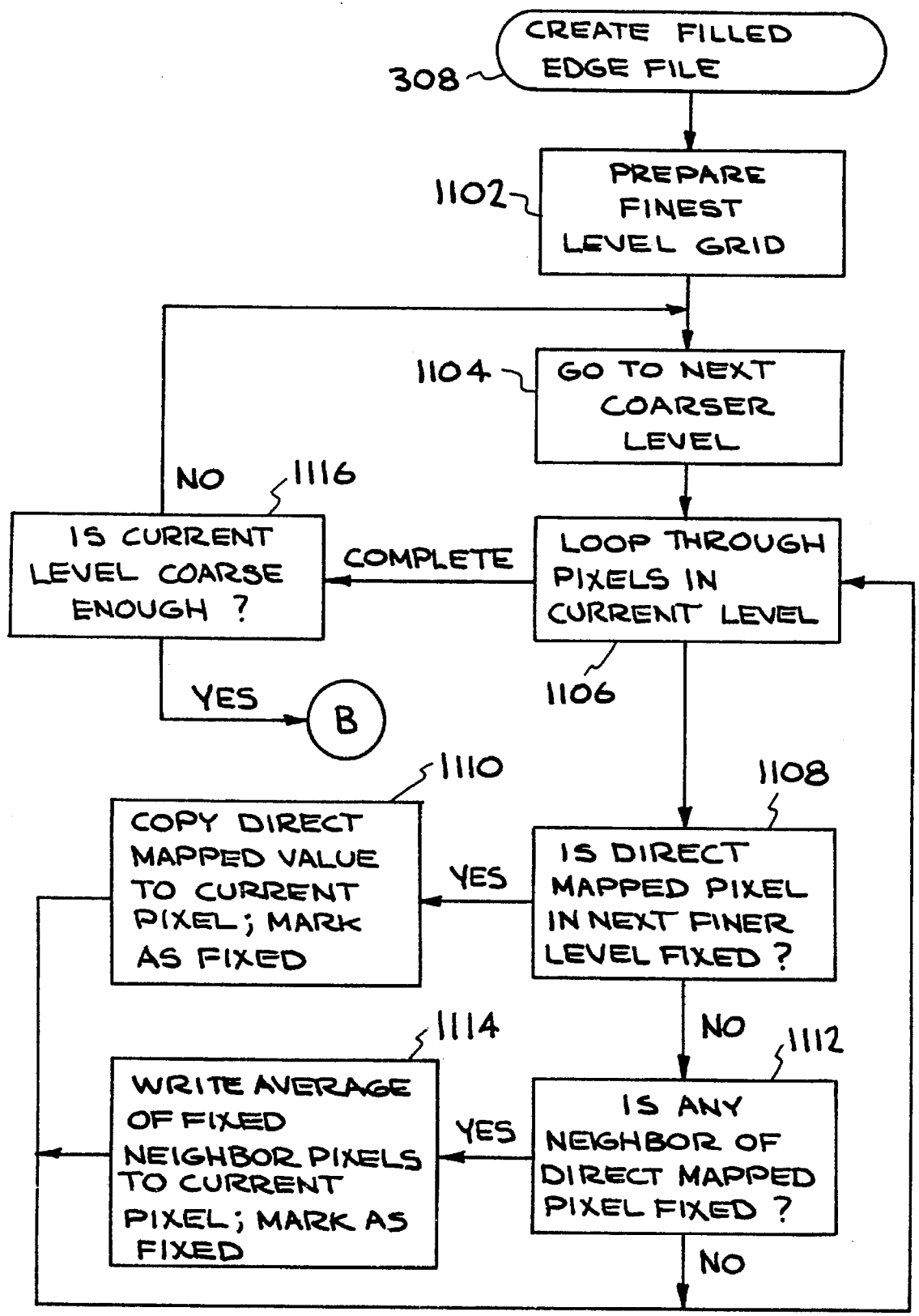
FIGS. 11 and 12 are flow charts of a procedure for performing step 308 in FIG. 3.
Figure 12:
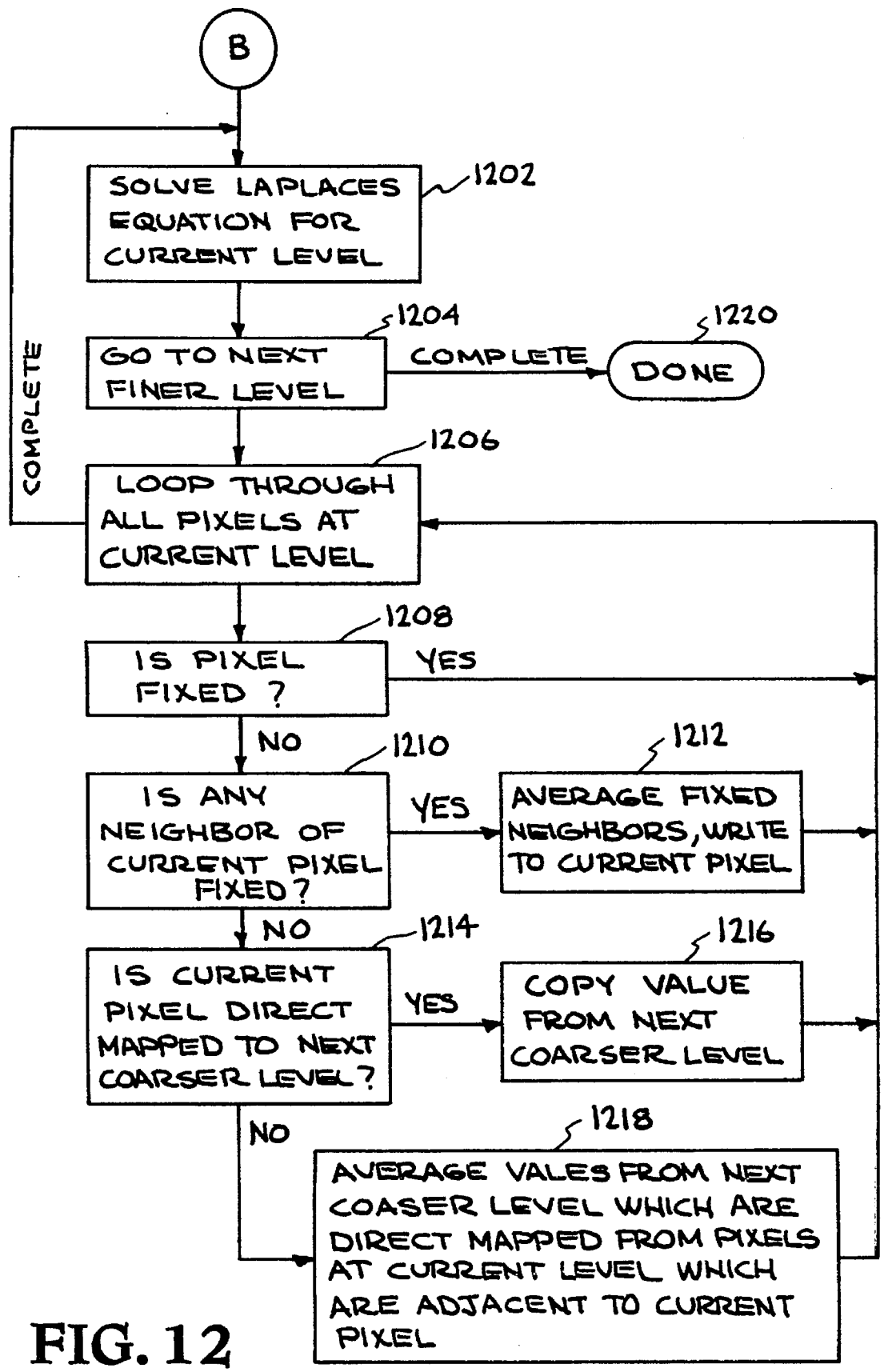
Figure 13:
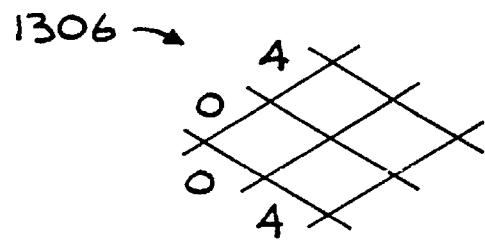
FIG. 13 illustrates a mapping between pixels of three grid levels.
Figure 13:
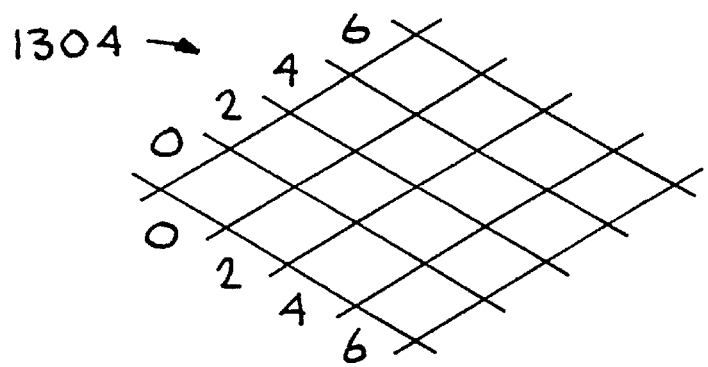
Figure 13:
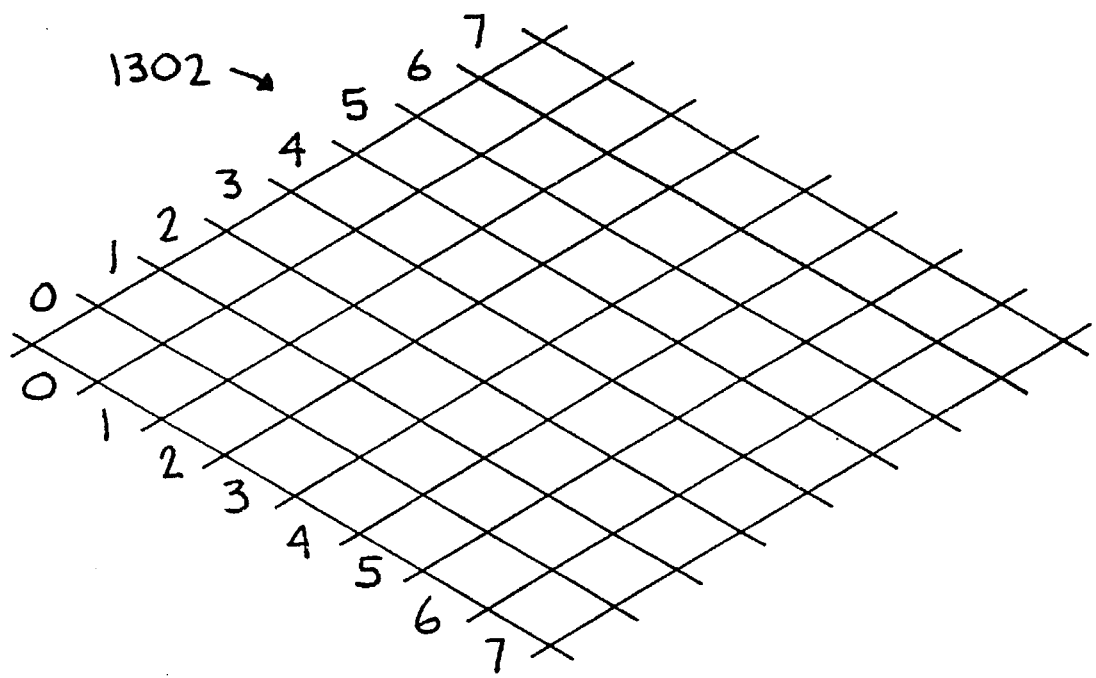

FIGS. 11 and 12 illustrate an example of a procedure using a pyramid to solve Laplace's equation with the multi-grid technique. In this example, each grid level is coarser than the previous level by, in a preferred embodiment, a factor of two in each dimension. (In a more general sense, each grid can be coarser than the next finer level grid by a factor of A in one dimension and B in the other dimension, where at least one of A and B is greater than one and both are integers greater than or equal to one.) FIG. 13 illustrates three levels of the solving pyramid using the preferred embodiment where A=B=2. The pyramid consists of a finest level grid 1302, an intermediate level grid 1304, and a coarsest level grid 1306. It can be seen that whereas the coordinate indices increment by one in each dimension in the finest level grid 1302, they increment by two in each dimension in the intermediate level grid, and by four in each dimension in the coarsest level grid. The coordinates are chosen for illustration purposes in FIG. 13 to illustrate a mapping which exists between the pixels of the three grid levels; specifically, each of the pixels in a given level of the grid "corresponds to" or is "directly mapped to" the pixel in the next finer level of the grid which has the same coordinates as illustrated in FIG. 13. Thus pixel (0,4) in grid level 1306 "corresponds" to pixel (0,4) in grid level 1304, which in turn "corresponds" to pixel (0,4) in grid level 1302. For every rectangle of four pixels in a particular level of the grid, a pixel in the next coarser level "corresponds" to one of the pixels in the rectangle of four, and none of the pixels in the next coarser level correspond to any of the remaining three pixels in the rectangle of four.

Referring to FIG. 11, the procedure 308 for creating a filled edge file begins in step 1102 by preparing the finest level grid by writing into the grid the values of all of the edge pixels identified in the edge file. These pixels are marked as "fixed" in the finest level grid, and all other pixels in the finest level grid are marked as not fixed.

In step 1104, attention is directed to the next coarser level grid. Step 1106 begins a loop through all of the pixels in the current level (which in this iteration is the second-finest level grid), and in step 1108, it is determined whether the direct-mapped pixel in the next finer level is fixed. If it is fixed, then in step 1110, the value from the corresponding pixel in the next finer level is copied up to the current level and marked as fixed (step 1110). If the direct-mapped pixel in the next finer level is not fixed, then it is determined whether any neighbor of the direct-mapped pixel in the next finer level is fixed (step 1112). In the preferred embodiment, for which the factors A=B=2, only the eight immediate neighbors of the direct-mapped pixel are examined in step 1112. If A>2 or B>2, then a larger neighborhood of pixels in the next finer level grid are examined in step 1112. In general, the neighborhood of pixels to be examined in step 1112 constitutes a rectangle having 2A - 1 pixels horizontally and 2B - 1 pixels vertically, and has its center at the direct-mapped pixel in the next finer level grid.

If at least one of the pixels in the neighborhood of the direct-mapped pixel in the next finer level grid is fixed, then in step 1114, a weighted average of all of the fixed pixels in the neighborhood is written into the current pixall at the current level. Where A=B=2, all of the fixed pixels in the next finer level which are adjacent to the direct-mapped pixel should contribute equalfly to the weighted average, but where A>2 or B>2, pixels which are farther from the direct-mapped pixel in the next finer level should preferably (but not essentially) contribute less to the weighted average, and in one embodiment, should not contribute at all to the weighted average if the pixel is blocked by another fixed pixel which is nearer to the direct-mapped pixel.

In steps 1110 and 1114, after a value has been written into the current pixel in the current level, that value is marked as fixed and the loop continues (step 1106) with the next pixel in the current level. If no pixel in the neighborhood of the direct-mapped pixel in the next finer level grid is fixed (step 1112), then no initial value is copied into the current pixel in the current level before control is returned to the looping step 1106.

After all of the pixels in the current level have been examined in step 1106, a determination is made (step 1116) as to whether the current level constitutes the coarsest level grid to be used in the pyramid. If not, then attention is directed to the next coarser level grid (step 1104) and all of the pixels are again examined as previously described (step 1106).

Once the coarsest level of the solving pyramid has been prepared (step 1116), a conventional technique is used to solve Laplace's equation for that level (step 1202 in FIG. 12). Any conventional method can be used, but the Gauss-Seidel method is preferred. The Gauss-Seidel method is described at page 864 of Press, Teukolsky, Vetterling and Flannery, "Numerical Recipes in C" (second ed.:1992). A successive over-relaxation modification of the basic Gauss-Seidel technique, also described in the Numerical Recipes book, is also possible. The entire Numerical Recipes book is incorporated herein by reference.

After Laplace's equation has been solved for the current level, attention is directed to the next finer level in step 1204. The remaining steps in the flow chart of FIG. 12 set an initial value for all of the pixels in the new level of the grid that are not fixed. Specifically, in step 1206, a loop is begun for all pixels in the current level. In step 1208, if the pixel is already fixed, then control returns to the looping step 1206 to move to the next pixel. If it is not already fixed, then in step 1210, it is determined whether any pixel in the neighborhood (as previously defined) of the current pixel is fixed. If so, then a weighted average of the fixed pixels in the neighborhood of the current pixel in the current level is written (as an initial, non-fixed value) to the current pixel in the current level (step 1212). Again, if the decimation rates are A=B=2, then the neighborhood of a given pixel consists of the eight pixels immediately adjacent to the given pixel.

If neither the current pixel nor any neighbor of the current pixel is fixed, then step 1214 determines whether the current pixel is a direct-mapped pixel to one in the next coarser level. As previously mentioned, only one of every A×B pixels in the current level will have a direct-mapped pixel in the next coarser level. If the pixel is direct mapped to the next coarser level, then the value from the corresponding pixel in the next coarser level is copied down to the current pixel, again as an initial, non-fixed value (step 1216). If none of the tests 1208, 1210 or 1214 are affirmative, then in step 1218, the value written into the current pixel at the current level (again as an initial, non-fixed value) is the average of the values from the next coarser level which are direct mapped from pixels at the current level which are in the neighborhood of the current pixel.

After an initial value is determined for the current pixel in the current level, either by steps 1212, 1216 or 1218, control returns to the looping step 1206 so that the next pixel in the current level can be examined. Once all the pixels in the current level have been examined, control returns to step 1202 for solving Laplace's equation at the current level by a conventional method such as one of those mentioned above, using all of the fixed pixels as boundary conditions and using all of the pixel values which have been written into non-fixed pixels in the current level as initial values. Attention is then directed to the next finer level (step 1204), and the same process repeats at that level. When the finest level grid has been solved, the filled edge file is complete (step 1220).

As previously mentioned, it is not essential that Laplace's equation be solved exactly because small imperfections are compensated in the difference file. Accordingly, in a variation of the process of copying down values from the coarser levels to finer levels and solving Laplace's equation for such finer levels, it is possible for an embodiment to limit the number of Gauss-Seidel iterations used to solve Laplace's equation for such finer level. This variation is most useful if used at the finest levels of the pyramid, and it is even possible for an embodiment to forego the Gauss-Seidel step altogether at the finest level. These variations can increase speed.

Returning to FIG. 3, after the filled edge file is subtracted from the image file to create the difference file (step 310), the difference file is encoded in step 312. A number of conventional techniques can be used to encode the difference file, as if it were an original image file. Most techniques will produce significantly better results on the difference file than they would on the original image file, since by subtracting out the edge information, most high spatial frequency components of the image have been suppressed. Preferably, therefore, the difference file is decimated by, for example, a factor of two or four in each dimension, before conventional image encoding is performed.

Figure 14:
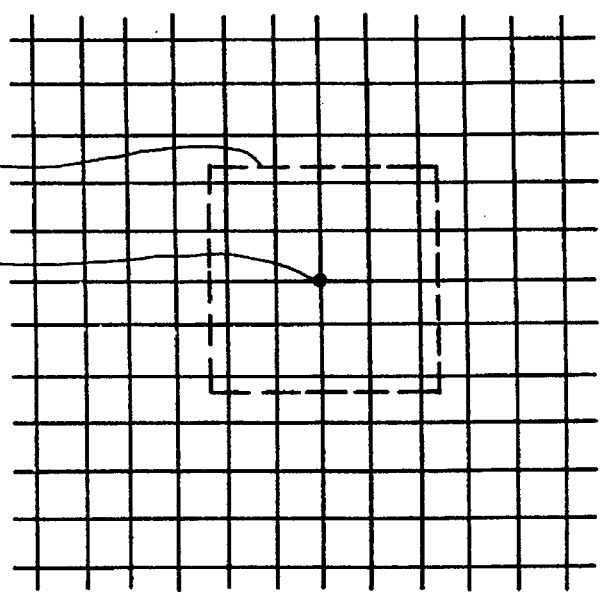
FIG. 14 illustrates a grid level.

The value of each pixel in the decimated grid is determined by thinking of it as being centered at the crosspoint center of a four by four pixel sub-array of the difference file grid. For example, in FIG. 14, if the fine grid represents the difference file array, with each small rectangle in the grid representing a pixel, then a pixel in the decimated grid would cover a 16-pixel rectangle 1402 of the difference file grid, centered at one of the crosspoints 1404 of the difference file grid. Several different methods may be used to choose the value of the pixel in the decimated grid, the idea being that a reverse method should be available to produce nearly the same difference grid pixel values on reconstruction. In one embodiment, the values of all 16 pixels in the difference array are merely averaged to produce a value for the overlying pixel in the decimated grid. If this method is used, then on reconstruction, all of the pixels in the four by four sub-array in the reconstructed difference file are given the same average value, and blur filtering can then be performed over the entire reconstructed difference file to reduce blockiness.

In another embodiment, an inverse interpolation is performed to obtain a value for each pixel in the decimated grid. Starting with an image I with dimensions n1*n2, this image is to be decimated in each dimension by factors p1 and p2, producing a reduced image J with dimensions m1*m2, from which a restored image $I^{res}$ can be constructed by interpolation. The reduced image is chosen so that the restored image is as close as possible to the original image, in the least-squares sense, so as to allow for relatively easy reconstruction.

The interpolation is dependent on an interpolation kernel K(i1,i2) that is a function of displacements i1 and i2. K(i1,i2) is a predefined weighting matrix defining, for each restored grid pixel $I^{res}$(i1,i2), the contribution that each pixel in the decimated file J should have in a weighted average to calculate the value to be assigned to the restored grid pixel $I^{res}$(i1,i2). That is, after the decimated matrix J is found, the restored array will be given by $$I^{res}(i1,i2) = \sum_{a1,a2} K(i1 - p1 * a1 + 1/2, i2 - p2 * a2 + 1/2) * J(a1,a2).$$

(In the above, a1 and a2 are coordinates of the decimated array, whereas i1 and i2 are coordinates of the difference array.)

K can be of any appropriate size in a given embodiment, but for a four by four decimation, K is preferably an eight-by-eight array. Thus on interpolation during reconstruction, each pixel value (and only those pixel values) in an eight-by-eight sub-array of the decimated grid will contribute to each pixel of the reconstructed difference array. The individual values of K should be chosen to decrease with increasing distance from the center of K; a Gaussian roll-off is possible, but a bi-linear roll-off is preferred due to its simplicity. Thus, K is preferably chosen as $$K(i1,i2) = \max\left(1 - \left|\frac{i1}{p2}\right|, 0\right) * \max\left(1 - \left|\frac{i2}{p2}\right|, 0\right).$$

Furthermore, if the kernel is scaled so that it sums up to 1, then the values J(a1,a2) will have (at least approximately)

the range of the original image's values, thus the justification for treating it as an image. Note that in a different embodiment, K can be chosen differently for different pixels on the restored grid.

To assure complete coverage, n1 and n2 must be given by:

n1=(m1—1)*p1 n2=(m2-1)*p2

A real-life image may not have those convenient dimensions; it is simply extended by copying neighboring pixels to fill up the difference.

The solution matrix J can be found by any method for a given image, but a least-squares solution can be found by minimizing $$\sum_{i1,i2} [I^{res}(i1,i2) - I(i1,i2)]^2$$

leading to a system of linear equations:

$$\sum_{b1,b2} \left[ \sum_{i1,i2} K(i1 - p1*a1 + 0.5, i2 - p2*a2 + 0.5) * K(i1 - p1*b1 + 0.5, i2 - p2*b2 + 0.5) \right] * J(b1,b2) =$$

$$\sum_{i1,i2} K(i1 - p1*a1 + 0.5, i2 - p2*a2 + 0.5) * I(i1,i2)$$

In these equations, the n1*n2 image I(i1,i2) is considered to be only one tile of an infinite image, where each tile has as neighbors other tiles that are equal to the original tile mirrored across their common border. In effect:

I(−i1,i2)=I(i1—1,i2)

I(i1,−i2)=I(i1,i2−1)

I(n1+i1,i2)=I(n1−i1−1,i2)

I(i1,n2+i2)=I(i1,n2−i2−1)

and so on, for each i from 0 to the corresponding n-1.

This makes the job much easier, and the problem reduces to the following.

Find the interpolation kernel * original image:

$$J_0(a1,a2) = \sum_{i1,i2} K(i1 - p1*a1 + 0.5, i2 - p2*a2 + 0.5) * I(i1,i2)$$

which is to be multiplied by 2 for a single border and by 4 for a corner (two borders at once). The kernel auto correlation function is:

$$C(a1 - b1, a2 - b2) =$$

$$\sum_{i1,i2} K(i1 - p1*a1 + 0.5, i2 - p2*a2 + 0.5) *$$

$$K(i1 - p1*b1 + 0.5, i2 - p2*b2 + 0.5)$$

which can be easily precalculated, and the resulting equations for J (b1,b2) are:

$$\sum_{b1,b2} C(a1 - b1, a2 - b2) * J(b1,b2) = J_0(a1,a2)$$

Due to the reflections, we have these symmetries, analogous to the ones for the I's:

J(−i1,i2)=J(i1−1,i2)

J(i1,−i2)=J(i1,i2−1)

J(m1+i1,i2)=J(m1−i1−1,i2)

J(i1,m2+i2)=J(i1,m2−i2−1)

and so on, for each i from 0 to the corresponding m-1.

This symmetry suggests that a solution can be found using some appropriate relative of the Fourier Transform, preferably the Discrete Cosine Transform, using the version that is used in JPEG, but over a much bigger index range (at least, most of the time).

The coefficients are given by:

$$R(n:a,i) = \begin{cases} \frac{1}{\sqrt{n}} & \text{if } a = 0, \\ \sqrt{\frac{2}{n}} * \cos\left(\frac{a*(2i+1)\pi}{2n}\right) & \text{if } a \neq 0 \end{cases}$$

The value n is the size of the block, which for JPEG, is n=8. The transformed values are:

$$\tilde{J}(a1,a2) = \sum_{i1,i2} R(m1:a1,i1) * R(m2:a2,j2) * J(i1,i2)$$

and the inverse-transformed values are:

$$J(i1,i2) = \sum_{a1,a2} R(m1:a1,i1) * R(m2:a2,j2) * \tilde{J}(a1,a2)$$

When this transform is done on the equation for J (b1,b2), we get $$\tilde{C}(a1,a2) * \tilde{J}(a1,a2) = \tilde{J}_0(a1,a2)$$

which can easily be solved by division. The transformed kernel auto correlation function is given by:

$$\tilde{C}(a1,a2) = \sum_{i1,i2} \cos\left[\frac{a1*(2i1+1)\pi}{2*m1}\right] *$$

$$\cos\left[\frac{a2*(2i2+1)\pi}{2*m2}\right] * C(i1,i2)$$

The solution matrix J calculated as above is a decimated version of the difference file. This solution matrix is essentially another image file, and is encoded by any conventional technique for encoding images, such as those incorporated above. Several of such techniques involve a quantization step as an important factor in the significant compression achieved. The quantization step destroys information, which is why such techniques are referred to as being "lossy". The coarser the quantization, the greater the information destruction, but the greater the compression. When compressing the decimated difference file in an embodiment of the present invention, it is desirable to choose a finer quantization in these techniques to minimize loss even at the expense of compression.

For example, if the JPEG technique is used for compressing the decimated difference file, then a quantization table should be adopted which is finer than one would expect if the quantization table of the Independent JPEG Group's standard is merely modified for the higher quality factor normally considered appropriate for a decimated image file. Such a quantization table could either be predefined and constant for all images, or optimized for each image separately and transmitted as overhead information to the receiver with each image. The quantization tables are also preferably chosen to be symmetrical about a diagonal from upper left to lower right, and increasing (or at least never decreasing) from left to right and from top to bottom. The preferred quantization tables for JPEG-encoding of these decimated image files are as follows:

| Luminance Table | | | | | | | |
|---|---|---|---|---|---|---|---|
| 16 | 16 | 16 | 16 | 24 | 40 | 51 | 72 |
| 16 | 16 | 16 | 19 | 26 | 58 | 64 | 92 |
| 16 | 16 | 16 | 24 | 40 | 57 | 78 | 95 |
| 16 | 19 | 24 | 29 | 56 | 87 | 87 | 98 |
| 24 | 26 | 40 | 56 | 68 | 109 | 109 | 112 |
| 40 | 58 | 57 | 87 | 109 | 109 | 121 | 121 |
| 51 | 64 | 78 | 87 | 109 | 121 | 121 | 121 |
| 72 | 92 | 95 | 98 | 112 | 121 | 121 | 121 |

| Chrominance Table | | | | | | | |
|---|---|---|---|---|---|---|---|
| 17 | 18 | 24 | 47 | 99 | 99 | 99 | 128 |
| 18 | 21 | 26 | 66 | 99 | 99 | 99 | 128 |
| 24 | 26 | 56 | 99 | 99 | 99 | 128 | 128 |
| 47 | 66 | 99 | 99 | 99 | 128 | 128 | 128 |
| 99 | 99 | 99 | 99 | 128 | 128 | 128 | 128 |
| 99 | 99 | 99 | 128 | 128 | 128 | 128 | 128 |
| 99 | 99 | 128 | 128 | 128 | 128 | 128 | 128 |
| 128 | 128 | 128 | 128 | 128 | 128 | 128 | 128 |

Returning to FIG. 3, a number of different techniques can be used to encode the edge file (step 304), including some described in the references incorporated above. One technique is to start from the edge list file, in which contours are already defined, and to group them into symbols of, for example, two edge pixels each. Such symbols are then Huffman encoded (or encoded by an equivalent technique mentioned above). The edge pixel values can also be dithered prior to encoding. This can be accomplished by rounding the first pixel value to a multiple of some quantization value, for example, 32, and then carrying the error forward to the value of the next pixel in the contour. The steps of quantizing and carrying forward of the error are repeated until the end of the contour is reached.

One particularly advantageous technique for encoding the contours is by describing each of them, or portions of them, as parameters to piecewise best-fit curves. The parameters are then encoded and transmitted. Preferred functions for this technique include B-spline functions and low-order polynomial functions such as Hermite and Bezier functions.

Regardless of which technique is used for encoding the contour file, compression can be improved further by first deleting any contours which are shorter than a predetermined length.

The image compression techniques described with respect to FIGS. 3 and 4 can achieve significantly greater compression than other techniques. However, many types of images do not require all of the steps called for in the figure. For example, many computer-generated images, which have hard edges bounding constant-colored regions of pixels, can be reconstructed perfectly, or nearly perfectly, from the edge information only. Specifically, in the source system, the edge pixels are extracted in the same manner as set forth above with respect to step 302 (FIG. 3), and encoded in the same manner as set forth above with respect to step 304. On reconstruction, the edge file is decoded in a manner appropriate to the encoding technique used, and a reconstructed filled edge file is created therefrom as in step 404 (FIG. 4). If filling is accomplished by solving Laplace's equation, for example, then the resulting reconstructed filled edge file can often be identical, or nearly identical, to the original computer-generated image.

As another example, certain types of images which do not have strong edges, or which have an unusually large number of edges, are best compressed without first subtracting the edge information. Compression techniques described above for compressing the difference file would in these cases be used instead to compress the original image file. Reconstruction would involve merely reversing the encoding of the received file.

Accordingly, in another aspect of the invention, a series of still images (which may or may not be separated by intermediate (delta) frames) are compressed using a compression approach appropriate to the image. The compressed data is transmitted to the receiving system together with an indication of which approach was used for each image, and the receiving system applies a reconstruction approach appropriate to the compression approach used. The approach selection technique can also be used for different parts of a single image.

Figure 15:
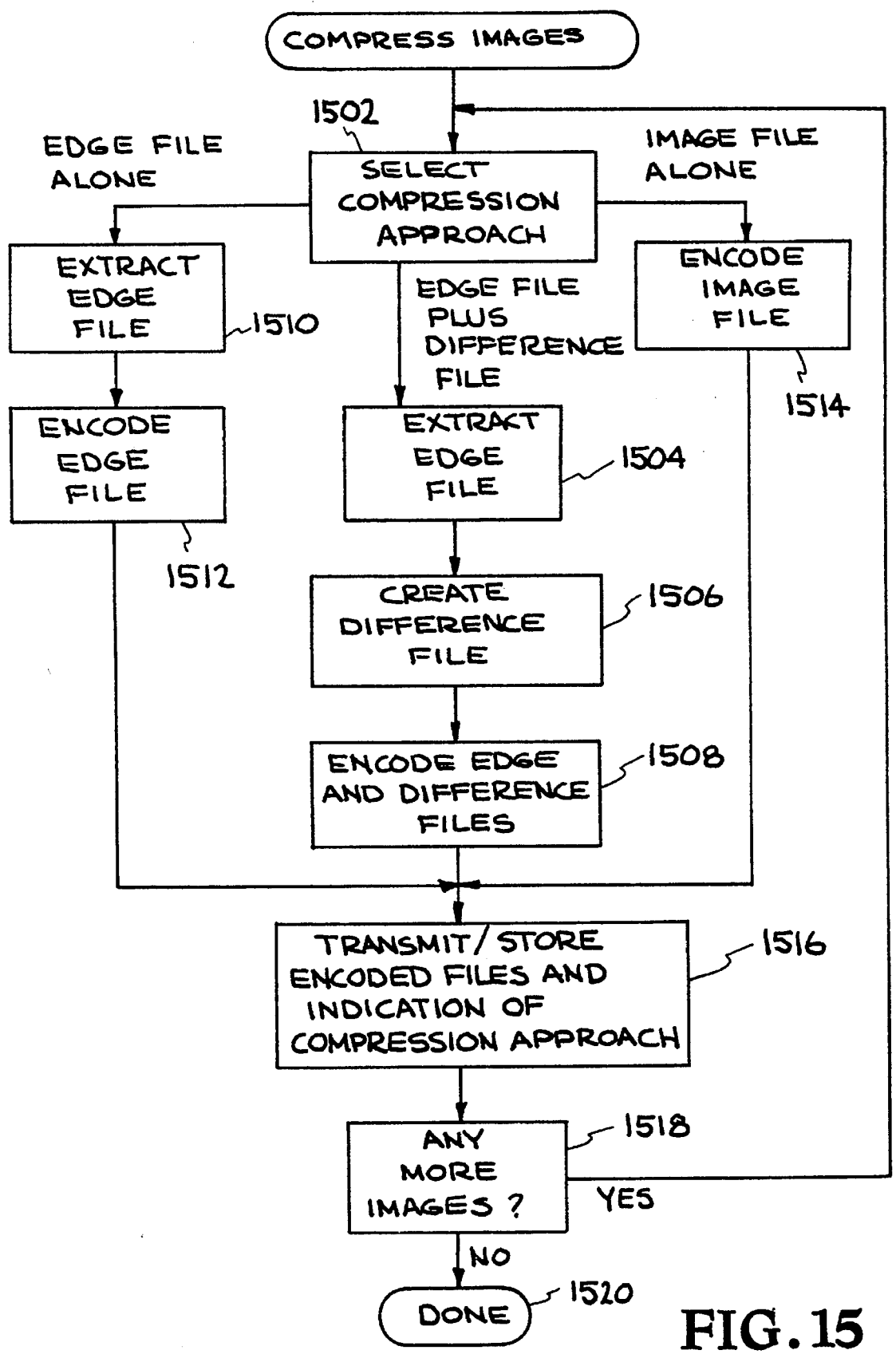
FIG. 15 is a flow chart illustrating an aspect of the invention.

FIG. 15 is a flow chart illustrating the compression approach selection technique. In a step 1502, a selection is made as to whether the first image is to be compressed using an approach which transmits the edge file alone, using an approach which transmits the image file alone, or using the edge file plus difference file approach described with respect to FIGS. 3 and 4. Depending the application, the selection can either be made manually or automatically. If made automatically, then it can be made as part of step 302 (FIG. 3) during the extraction of the edge file. For example, if the edge identification process reaches the point of having identified more than some predetermined number of edge pixels in the image, then the selection can automatically be made to compress and transmit the image file alone.

If the edge file plus difference file is to be transmitted, then the edge file is extracted (step 1504), the difference file is created (step 1506), and the edge and difference files are encoded (step 1508) in the same manner as set forth above with respect to FIG. 3. If the edge file alone is to be transmitted, then the edge file is extracted (step 1510) and encoded (step 1512) in the manner set forth above. If the image file is to be transmitted alone, then it is encoded (step 1514) in the same manner that a difference file is encoded in step 312 of FIG. 3 (including inverse interpolation, decimation and fine JPEG quantization).

Regardless of which approach is selected for the particular image, the resulting data is transmitted to the receiving system together with an indication of the compression approach selected for the particular image (step 1516). If more images are to be compressed (step 1518), then control returns to the compression approach selection step 1502. Otherwise, the process is complete (step 1520).

Figure 16:
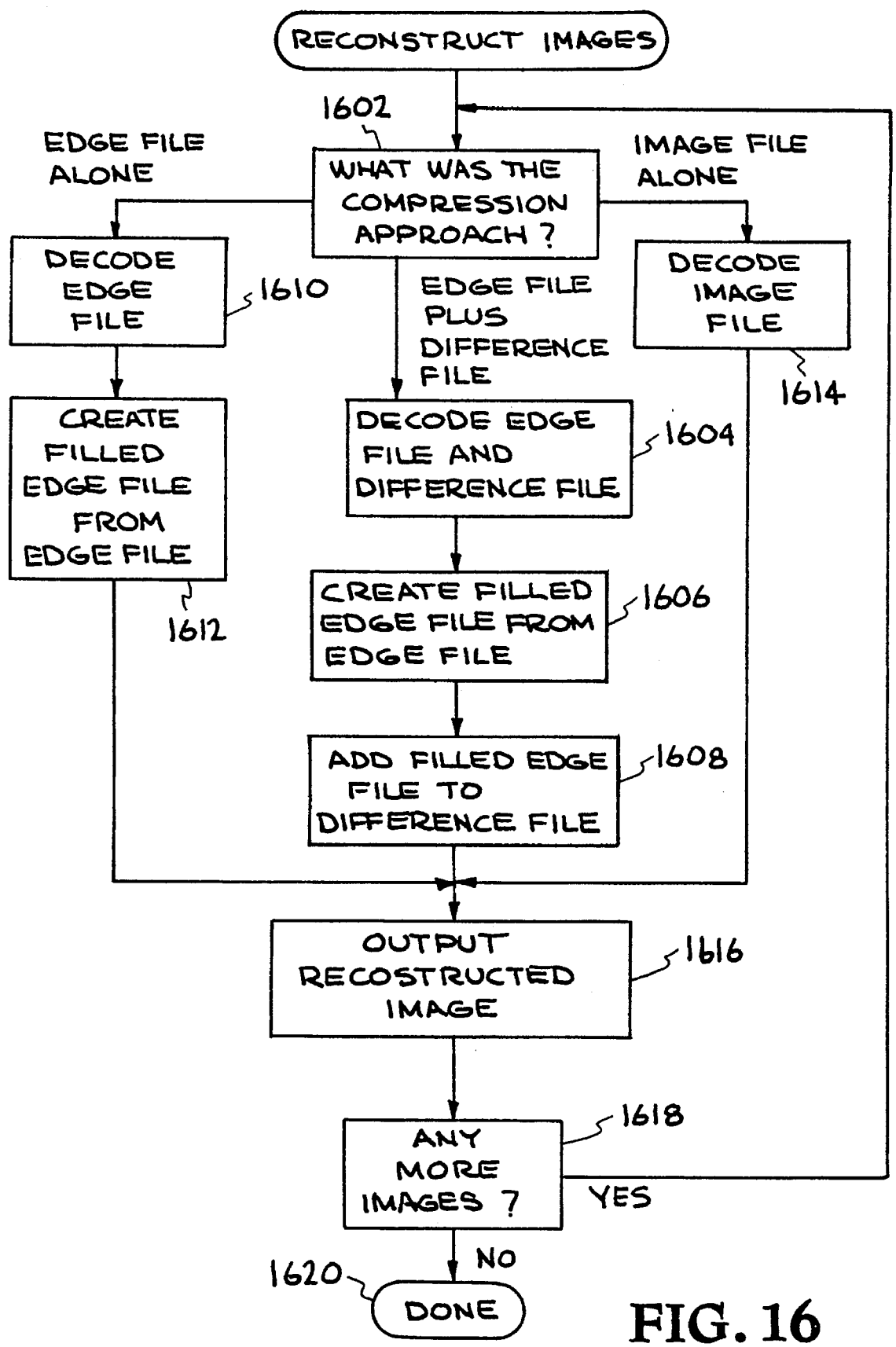
FIG. 16 is a flow chart describing a procedure for reconstructing images compressed according to the technique illustrated in FIG. 15.

FIG. 16 is a flow chart describing a procedure for reconstructing images compressed according to the approach selection technique described in FIG. 15. In a step 1602, the compression approach indication received with a particular image is examined to determine which reconstruction approach should be used. If the compression approach involved transmitting the edge file plus difference file, then the two files are decoded (step 1604), a reconstructed filled edge file is created (step 1606), and added to the decoded difference file (step 1608), all in the same manner as set forth above with respect to FIG. 4. If the compression approach involved transmitting the edge file alone, then the edge file is decoded (step 1610) and filled (step 1612) in the manner set forth above with respect to steps 402 and 404 of FIG. 4. If the compression approach involved transmitting the image file alone, then the image file is decoded (step 1614) in the manner set forth above with respect to step 402.

Regardless of which approach is used to reconstruct the image, the reconstructed image is outputted in step 1616 to a display 208 (FIG. 2) or to some other device. If more images are available to reconstruct (step 1618), then control returns to the reconstruction approach selection step 1602. Otherwise, the routine exits (step 1620).

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for communicating via a transmission medium of limited bandwidth, an image represented by an image array of pixels each having a first value in a computer-readable storage medium, comprising the steps of:

identifying pixels of said image array being edge pixels lying on edges of said image;

creating a filled edge array of pixels each corresponding to a respective pixel in said image array, each of the pixels in said filled edge array, which corresponds to an edge pixel of said image array, having a first value that is responsive to the first value of at least one pixel of said image array selected in response to the edge pixel, and each of the pixels in said filled edge array, which does not correspond to an edge pixel of said image array, having a first value that is a function of the first values of at least one of the pixels in said filled edge array which do correspond to edge pixels of said image array;

subtracting said filled edge array from said image array to create a difference array of pixels; and transmitting signals responsive to said difference array of pixels via said transmission medium.

2. A method according to claim 1, wherein each of said pixels in said image array further has second and third values, wherein each of the pixels in said filled edge array, which corresponds to an edge pixel of said image array, further has a second value that is responsive to the second value of the at least one pixel of said image array selected in response to the edge pixel, and further has a third value that is responsive to the third value of the at least one pixel of said image array selected in response to the edge pixel, and wherein each of the pixels in said filled edge array, which do not correspond to an edge pixel of said image array, has a second value that is a function of the second values of at least one of the pixels in said filled edge array which do correspond to edge pixels of said image array, and further has a third value that is a function of the third values of at least one of the pixels in said filled edge array which do correspond to edge pixels of said image array, and wherein said step of subtracting said filled edge array from said image array comprises the step of subtracting the first, second and third value of each pixel of said filled edge array from respectively the first, second and third value of the corresponding pixel in said image array.

3. A method according to claim 2, wherein said step of identifying said edge pixels comprises the step of identifying adjacent pairs of pixels of said image array between which the absolute value of the spatial derivative of the at least one of the first, second and third values of said pixels, in a dimension perpendicular to a border between the pair of pixels, reaches a maximum larger than a threshold value, each pixel in each of said adjacent pairs being an edge pixel.

4. A method according to claim 1, wherein said step of identifying said edge pixels comprises the step of identifying adjacent pairs of pixels of said image array between which the absolute value of the spatial derivative of the pixel values, in a dimension perpendicular to a border between the pair of pixels, reaches a maximum larger than a threshold value, each pixel in each of said adjacent pairs being an edge pixel.

5. A method according to claim 4, wherein said step of identifying adjacent pairs of pixels comprises the steps of:

identifying all such adjacent pairs of pixels which are adjacent in a first dimension of said image; and subsequently identifying all such adjacent pairs of pixels which are adjacent in a second dimension of said image perpendicular to said first dimension of said image.

6. A method according to claim 1, wherein said step of identifying said edge pixels comprises the steps of:

(a) identifying each given pair of horizontally adjacent pixels in said image array for which (1) the absolute value of a first dot product being the dot product of a 4 pixel by 3 pixel derivative operator and a 4 pixel by 3 pixel sub-array of said image array centered between said given pair of pixels, exceeds a derivative threshold, (2) the absolute value of the difference between (A) a second dot product being the dot product of a 3 pixel by 3 pixel Laplacian operator and a 3 pixel by 3 pixel sub-array of said image centered at a first pixel of said given pair, and (B) a third dot product being the dot product of said 3 pixel by 3 pixel Laplacian operator and a 3 pixel by 3 pixel sub-array of said image centered at a second pixel of said given pair, exceeds a Laplacian threshold, (3) said second and third dot products are opposite in sign, and (4) the sign of the gradient from the first value of said first pixel of said given pair to the first value of said second pixel of said given pair, is opposite the sign of the gradient from said second dot product to said third dot product; and (b) identifying each particular pair of vertically adjacent pixels in said image array for which (1) the absolute value of a fourth dot product being the dot product of the transpose of said 4 pixel by 3 pixel derivative operator and a 3 pixel by 4 pixel sub-array of said image array centered between said particular pair of pixels, exceeds said derivative threshold, (2) the absolute value of the difference between (A) a fifth dot product being the dot product of the transpose of said 3 pixel by 3 pixel Laplacian operator and a 3 pixel by 3 pixel sub-array of said image centered at a first pixel of said particular pair, and (B) a sixth dot product being the dot product of the transpose of said 3 pixel by 3 pixel Laplacian operator and a 3 pixel by 3 pixel sub-array of said image centered at a second pixel of said particular pair, exceeds said Laplacian threshold, (3) said fifth and sixth dot products are opposite in sign, and (4) the sign of the gradient from the first value of said first pixel of said particular pair to the first value of said second pixel of said particular pair, is opposite the sign of the gradient from said fifth dot product to said sixth dot product.

7. A method according to claim 1, wherein the at least one pixel of said image array selected in response to each given one of said edge pixels consists of the given edge pixel.

8. A method according to claim 1, wherein the at least one pixel of said image array selected in response to at least one of said edge pixels includes a pixel different from said at least one of said edge pixels.

9. A method according to claim 1, wherein the at least one pixel of said image array selected in response to at least one of said edge pixels comprises a plurality of pixels, and wherein said first value responsive to the first value of said at least one pixel is an average of the first values of the pixels in said plurality of pixels.

10. A method according to claim 1, wherein the at least one pixel of said image array selected in response to each given one of said edge pixels for which a second pixel adjacent to said given edge pixel in a first direction in said image array is also an edge pixel, consists of a pixel which is the lesser of N1 and N2 pixels distant from said given edge pixel in the direction opposite said first direction in said image array, where N1 is a predetermined number and N2 is less than or equal to half the number of pixels from said given edge pixel and the nearest edge pixel to said given edge pixel in the direction opposite said first direction in said image array.

11. A method according to claim 1, wherein the at least one pixel of said image array selected in response to each given one of said edge pixels for which a second pixel adjacent to said given edge pixel in a first direction in said image array is also an edge pixel, comprises a set of the pixels on a line in said image array which extend from the given edge pixel to the lesser of N1 and N2 pixels distant from the given edge pixel in the direction opposite said first direction in said image array, where N1 is a predetermined number and N2 is less than or equal to half the number of pixels from said given edge pixel and the nearest edge pixel to said given edge pixel in the direction opposite said first direction in said image array.

12. A method according to claim 1, wherein the influence on said function of the first value of each edge pixel surrounding each given one of the pixels in said filled edge array which does not correspond to an edge pixel of said image array, decreases as the distance in said image array between said surrounding edge pixel and said given pixel increases.

13. A method according to claim 1, wherein said step of creating a filled edge array comprises the steps of:

fixing the first value of each of the pixels in said filled edge array which corresponds to an edge pixel of said image array, responsively to the first value of said at least one pixel of said image array selected in response to the edge pixel; and subsequently solving Laplace's equation over the first values of said filled edge array of pixels, taking as boundary conditions the first values of each of the pixels in said filled edge array which corresponds to an edge pixel of said image array.

14. A method according to claim 13, wherein said filled edge array has a size of M pixels in a first dimension and N pixels in a second dimension, and wherein said step of solving Laplace's equation comprises the steps of:

preparing a next coarser level array having M/A pixels in said first dimension and N/B pixels in said second dimension, where A and B are predetermined integers at least one of which is greater than 1, each pixel in said next coarser level array corresponding to a respective pixel in said filled edge array, each pixel in said next coarser level array having a first value fixed at the first value of the corresponding pixel in said filled edge array if the corresponding pixel in said filled edge array is fixed, each pixel in said next coarser level array having a first value fixed at a weighted average of the first values of those pixels in a predefined neighborhood of the corresponding pixel in said filled edge array which are fixed if the corresponding pixel in said filled edge array is not fixed but at least one pixel in said neighborhood of the corresponding pixel in said filled edge array is fixed;

solving Laplace's equation over the first values of said next coarser level array of pixels, taking as boundary conditions those first values of said next coarser level array which are fixed;

setting the first value of each pixel in said filled edge array which is not fixed, the neighborhood of which pixel includes at least one pixel whose first value is fixed, to a weighted average of the first values of those pixels in said neighborhood which are fixed;

after said step of solving Laplace's equation over the first values of said next coarser level array, setting the first value of each pixel in said filled edge array which is not fixed and which corresponds to a pixel of said next coarser level array, the neighborhood of which pixel in said filled edge array includes no pixel whose first value is fixed, to the first value of the corresponding pixel of said next coarser level array;

after said step of solving Laplace's equation over the first values of said next coarser level array, setting the first value of each pixel in said filled edge array which is not fixed and which does not correspond to a pixel of said next coarser level array, the neighborhood of which pixel in said filled edge array includes no pixel whose first value is fixed, to a weighted average of the first values of those pixels in said next coarser level array which correspond to a pixel in the neighborhood of the pixel in said filled edge array; and subsequently solving Laplace's equation over the first values of said filled edge array, taking as boundary conditions those first values of said filled edge array which are fixed, and taking as initial values those first values of said filled edge array which are not fixed.

15. A method according to claim 14, wherein the neighborhood of a given pixel in said filled edge array is predefined as a sub-array of said filled edge array which has 2A-1 pixels in said first dimension and 2B-1 pixels in said second dimension and has said given pixel at its center if A and B are both even and has said given pixel adjacent to said center if at least one of A and B is not even.

16. A method according to claim 14, wherein A=B=2 and wherein the neighborhood of a given pixel in said filled edge array is predefined as a 3 by 3 pixel sub-array of said filled edge array having said given pixel at its center.

17. A method according to claim 1, further comprising the steps of:

forming an edge file identifying said edge pixels of said image array and the first value of each of said edge pixels; and transmitting signals responsive to said edge file via said transmission medium.

18. A method according to claim 17, wherein said transmission medium comprises a data storage medium.

19. A method according to claim 17, further comprising the step of encoding said edge file prior to said step of transmitting signals responsive to said edge file, said step of encoding said edge file comprising the steps of:

identifying contours of said image array in response to said edge pixels identified in said step of identifying pixels of said image array lying at edges of said image; and encoding said contours.

20. A method according to claim 19, wherein said step of encoding said contours comprises the steps of:

representing one of said contours using, for each edge pixel in a contour except a last pixel in said contour, an indication of the first value of the edge pixel and an indication of a direction in said image array of a respective next pixel in said contour;

grouping said indications into symbols; and Huffman encoding said symbols.

21. A method according to claim 19, wherein said step of encoding said contours comprises the steps of:

fitting at least one of said contours to a best fit curve; and encoding a parametric description of said curve.

22. A method according to claim 17, further comprising the step of encoding said difference array prior to said step of transmitting signals responsive to said difference array, said step of encoding said difference array comprising the steps of:

decimating said difference array in first and second dimensions of said difference array; and encoding said decimated difference array.

23. A method according to claim 17, further comprising the step of creating a reconstructed array of pixels in response to said transmitted signals responsive to said edge file and said transmitted signals responsive to said difference array.

24. A method according to claim 23, wherein said step of creating a reconstructed array of pixels comprises the steps of:

creating a preliminary array of pixels in response to said transmitted signals responsive to said edge file, each pixel in said preliminary array corresponding to a respective pixel in said filled edge array, and each pixel in said preliminary array having a respective first value substantially equal to the first value of the corresponding pixel in said filled edge array;

creating a transmitted difference array in response to said transmitted signals responsive to said difference array: and adding said preliminary array to said transmitted difference array.

25. A method for communicating, via a transmission medium of limited bandwidth, a plurality of images each being represented by a respective image array of pixels in a computer-readable storage medium, comprising the steps of:

selecting a respective compression approach for each of said images from a plurality of available compression approaches including first and second compression approaches;

compressing each of said images according to the compression approach selected for the image; and transmitting via said transmission medium each of said images as compressed, in correspondence with an indication of the approach selected for the image, wherein said first compression approach comprises, for a subject image, the steps of:

identifying edge pixels of the image array representing said subject image which lie at edges of said subject image; and encoding an indication of each of said edge pixels in correspondence with a value of each of said edge pixels.

26. A method according to claim 25, wherein said second compression approach comprises the steps of said first compression approach, and further comprises the steps of:

creating a filled edge array of pixels each corresponding to a respective pixel in the image array representing said subject image, each of the pixels in said filled edge array, which correspond to an edge pixel of said image array, having a value that is responsive to the value of at least one pixel of said image array selected in response to the edge pixel, and each of the pixels in said filled edge array, which do not correspond to an edge pixel of said image array, having a value that is a function of the values of at least one of the pixels in said filled edge array which do correspond to edge pixels of said image array;

subtracting said filled edge array from said image array to create a difference array of pixels; and encoding said difference array.

27. A method according to claim 26, wherein said plurality of available compression approaches includes a third compression approach comprising, for said subject image, the steps of:

decimating in two dimensions the image array representing said subject image; and encoding said decimated image array.

28. A method according to claim 25, further comprising the steps of:

selecting a reconstruction approach in response to indication, transmitted in correspondence with each of said compressed images, of the compression approach selected for the image; and developing a reconstructed image in response to each of said transmitted compressed images using the reconstruction approach selected for the image, wherein the reconstruction approach selected for a subject image which was compressed according to said first compression approach comprises the step of creating a filled edge array of pixels each corresponding to a respective pixel in the image array representing said subject image, each of the pixels in said filled edge array, which correspond to an edge pixel of said image array, having a value that is equal to the value of a pixel of said image array selected in response to the edge pixel, and each of the pixels in said filled edge array, which do not correspond to an edge pixel of said image array, having a value that is a function of the values of at least one of the pixels in said filled edge array which do correspond to edge pixels of said image array.

29. A method according to claim 25, wherein one of said images in said plurality of images is part of a larger image.

30. A method for forming a reconstructed image, comprising the steps of:

receiving over a transmission medium having limited bandwidth an indication of pixels in a destination image array which are to be edge pixels lying on edges of said image, and a first value for each of said edge pixels;

forming said destination image array of pixels in a computer-readable storage medium such that each given pixel in said array which is one of said edge pixels has a respective first value substantially equal to the first value received over said transmission medium for a given edge pixel; and solving Laplace's equation over the first values of said destination image array, taking as boundary conditions the first values of each of said edge pixels.

31. A method according to claim 30, further comprising, prior to said step of receiving, the steps of:

identifying said edge pixels in a source image array; and transmitting over said transmission medium an indication of said identified edge pixels as said indication of pixels in said destination image array which are to be edge pixels lying on edges of said reconstruction image.

32. A method for forming a reconstructed image, comprising the steps of:

receiving over a transmission medium having limited bandwidth an indication of pixels in a destination image array which are to be edge pixels lying on edges of said image, and a first value for each of said edge pixels;

forming said destination image array of pixels in a computer-readable storage medium such that each given pixel in said array which is one of said edge pixels has a respective first value substantially equal to the first value received over said transmission medium for said given edge pixel, and such that each pixel in said destination image array which is not one of said edge pixels has a respective first value which is a function of the first values of edge pixels in said destination image array;

receiving over said transmission medium a difference image array of pixels; and adding said destination image array and said difference image array.

33. A method according to claim 32, wherein said received difference image array has a coarser grid than said destination image array, further comprising the step of interpolating said difference image array, prior to said step of adding, such that each pixel in said difference image array corresponds to a respective pixel in said destination image array.

34. A method according to claim 33, wherein said step of interpolating comprises a bi-linear interpolation.

35. A method according to claim 32, wherein said step of forming comprises the steps of:

writing the first values to said edge pixels of said destination image array as fixed values; and solving Laplace's equation over the first values of said destination image array, taking as boundary conditions the first values of each of said edge pixels.

36. A method according to claim 35, wherein said destination image array has a size of M pixels in a first dimension and N pixels in a second dimension, and wherein said step of solving Laplace's equation comprises the steps of:

preparing a next coarser level array having M/A pixels in said first dimension and N/B pixels in said second dimension, where A and B are predetermined integers at least one of which is greater than 1, each pixel in said next coarser level array corresponding to a respective pixel in said destination image array, each pixel in said next coarser level array having a first value fixed at the first value of the corresponding pixel in said destination image array if the corresponding pixel in said destination image array is fixed, each pixel in said next coarser level array having a first value fixed at a first predefined function of the first values of those pixels in a predefined neighborhood of the corresponding pixel in said destination image array which are fixed if the corresponding pixel in said destination image array is not fixed but at least one pixel in said neighborhood of the corresponding pixel in said destination image array is fixed;

solving Laplace's equation over the first values of said next coarser level array of pixels, taking as boundary conditions those first values of said next coarser level array which are fixed;

setting the first value of each pixel in said destination image array which is not fixed, the neighborhood of which pixel includes at least one pixel whose first value is fixed, to a second predefined function of the first values of those pixels in said neighborhood which are fixed;

after said step of solving Laplace's equation over the first values of said next coarser level array, setting the first value of each pixel in said destination image array which is not fixed and which corresponds to a pixel of said next coarser level array, the neighborhood of which pixel in said destination image array includes no pixel whose first value is fixed, to the first value of the corresponding pixel of said next coarser level array;

after said step of solving Laplace's equation over the first values of said next coarser level array, setting the first value of each pixel in said destination image array which is not fixed and which does not correspond to a pixel of said next coarser level array, the neighborhood of which pixel in said destination image array includes no pixel whose first value is fixed, to a third predefined function of the first values of those pixels in said next coarser level array which correspond to a pixel in the neighborhood of the pixel in said destination image array; and subsequently solving Laplace's equation over the first values of said destination image array, taking as boundary conditions those first values of said destination image array which are fixed, and taking as initial values those first values of said destination image array which are not fixed.

37. A method according to claim 36, wherein A=B=2, wherein the neighborhood of a given pixel in said destination image array is predefined as a 3 by 3 pixel sub-array of said destination image array having said given pixel at its center, and wherein each of said predefined functions are weighted averages.

38. Apparatus for solving Laplace's equation over the values of respective elements in a first array having a size of M elements in a first dimension and N elements in a second dimension, the values of at least some of elements in said first array being fixed, comprising:

means for preparing a second level array having M/A elements in said first dimension and N/B elements in said second dimension, where A and B are predetermined integers at least one of which is greater than 1, each element in said second level array corresponding to a respective element in said first array, each element in said second level array having a value fixed at the value of the corresponding element in said first array if the corresponding element in said first array is fixed, each element in said second level array having a value fixed at a first predefined function of the values of those elements in a predefined neighborhood of the corresponding element in said first array which are fixed if the corresponding element in said first array is not fixed but at least one element in said neighborhood of the corresponding element in said first array is fixed;

means for solving Laplace's equation over the values of said second level array of elements, taking as boundary conditions those values of said second level array which are fixed;

means for setting the value of each element in said first array which is not fixed, the neighborhood of which element includes at least one element whose value is fixed, to a second predefined function of the values of those elements in said neighborhood which are fixed;

means for, after solving Laplace's equation over the values of said second level array, setting the value of each element in said first array which is not fixed and which corresponds to an element of said second level array, the neighborhood of which element in said first array includes no element whose value is fixed, to the value of the corresponding element of said second level array;

means for, after solving Laplace's equation over the values of said second level array, setting the value of each element in said first array which is not fixed and which does not correspond to an element of said second level array, the neighborhood of which element in said first array includes no element whose value is fixed, to a third predefined function of the values of those elements in said second level array which correspond to an element in the neighborhood of the element in said first array; and means for subsequently solving Laplace's equation over the values of said first array, taking as boundary conditions those values of said first array which are fixed, and taking as initial values those values of said first array which are not fixed.

39. Apparatus according to claim 38, wherein the neighborhood of a given element in said first array is predefined as a sub-array of said first array which has 2A-1 elements in said first dimension and 2B-1 elements in said second dimension and has said given element at its center if A and B are both even and has said given element adjacent to said center if at least one of A and B is not even.

40. Apparatus according to claim 38, wherein A=B=2 and wherein the neighborhood of a given element in said first array is predefined as a 3 by 3 element sub-array of said first array having said given element at its center.

41. Apparatus according to claim 38, wherein each of said predefined functions are weighted averages.

42. Apparatus according to claim 38, wherein said means for solving Laplace's equation over the values of said second level array of elements, comprises:

means for preparing a third level array having $M/A^2$ elements in said first dimension and $N/B^2$ elements in said second dimension, each element in said third level array corresponding to a respective element in said second level array, each element in said third level array having a value fixed at the value of the corresponding element in said second level array if the corresponding element in said second level array is fixed, each element in said third level array having a value fixed at said first predefined function of the values of those elements in said neighborhood of the corresponding element in said second level array which are fixed if the corresponding element in said second level array is not fixed but at least one element in said neighborhood of the corresponding element in said second level array is fixed;

means for solving Laplace's equation over the values of said third level array of elements, taking as boundary conditions those values of said third level array which are fixed;

means for setting the value of each element in said second level array which is not fixed, the neighborhood of which element includes at least one element whose value is fixed, to said second predefined function of the values of those elements in said neighborhood which are fixed;

means for, after solving Laplace's equation over the values of said third level array, setting the value of each element in said second level array which is not fixed and which corresponds to an element of said third level array, the neighborhood of which element in said second level array includes no element whose value is fixed, to the value of the corresponding element of said third level array;

means for, after solving Laplace's equation over the values of said third level array, setting the value of each element in said second level array which is not fixed and which does not correspond to an element of said third level array, the neighborhood of which element in said second level array includes no element whose value is fixed, to said third predefined function of the values of those elements in said third level array which correspond to an element in the neighborhood of the element in said second level array; and means for subsequently solving Laplace's equation over the values of said second level array, taking as boundary conditions those values of said second level array which are fixed, and taking as initial values those values of said second level array which are not fixed.

43. Apparatus for solving Laplace's equation over the values of respective elements in a first level array having a size of M elements in a first dimension and N elements in a second dimension, the values of at least some of elements in said first level array being fixed, comprising:

means for preparing a second level array having M/2 elements in said first dimension and N/2 elements in said second dimension, each element in said second level array corresponding to a respective element in said first level array, each element in said second level array having a value fixed at the value of the corresponding element in said first level array if the corresponding element in said first level array is fixed, each element in said second level array having a value fixed at a weighted average of the values of those elements in a 3 by 3 element neighborhood of the corresponding element in said first level array which are fixed if the corresponding element in said first level array is not fixed but at least one element in said 3 by 3 element neighborhood of the corresponding element in said first level array is fixed;

means for invoking said means for preparing, repeatedly for successively coarser level arrays until a predefined coarsest level array is prepared;

means for, after said coarsest level array is prepared, solving Laplace's equation over the values of said coarsest level array of elements, taking as boundary conditions those values of said coarsest level array which are fixed;

means for setting the value of each element in each level array which is not fixed, the 3 by 3 element neighborhood of which element includes at least one element whose value is fixed, to a weighted average of the values of those elements in said 3 by 3 element neighborhood which are fixed;

means for, after solving Laplace's equation over the values of said coarsest level array, setting the value of each element in the next finer level array which is not fixed and which corresponds to an element of said coarsest level array, the 3 by 3 element neighborhood of which element in said next finer level array includes no element whose value is fixed, to the value of the corresponding element of said coarsest level array;

means for, after solving Laplace's equation over the values of said coarsest level array, setting the value of each element in said next finer level array which is not fixed and which does not correspond to an element of said coarsest level array, the 3 by 3 element neighborhood of which element in said next finer level array includes no element whose value is fixed, to a weighted average of the values of those elements in said coarsest level array which correspond to an element in the 3 by 3 element neighborhood of the element in said next finer level array;

means for, after setting values in the next finer level array, solving Laplace's equation over the values of said next finer level array, taking as boundary conditions those values of said next finer level array which are fixed, and taking as initial values those values of said next finer level array which are not fixed; and means for invoking the means for setting values in the next finer level array and the means for solving Laplace's equation over values of the next finer level array, repeatedly for successively finer level arrays until Laplace's equation has been solved over values of the first level array.

44. Apparatus according to claim 43, wherein said coarsest level is predefined as that level having no more than predefined numbers of elements in each dimension.

45. Apparatus according to claim 43, wherein said coarsest level is predefined as the finest level in which the values of all elements are fixed.

* * * * *